(12) United States Patent
Morimoto et al.

(10) Patent No.: US 9,286,360 B2
(45) Date of Patent: Mar. 15, 2016

(54) INFORMATION PROCESSING SYSTEM, INFORMATION PROCESSING DEVICE, INFORMATION PROCESSING METHOD, AND COMPUTER READABLE RECORDING MEDIUM

(71) Applicant: MELCO HOLDINGS INC., Nagoya-shi (JP)

(72) Inventors: Takeshi Morimoto, Chuo-ku (JP); Shingo Nishioka, Chuo-ku (JP); Kentarou Suzuki, Chuo-ku (JP); Daisuke Maki, Chuo-ku (JP); Makoto Oya, Chuo-ku (JP); Masayuki Nemoto, Nagoya (JP)

(73) Assignee: MELCO HOLDINGS INC., Nagoya-shi (JP)

( * ) Notice: Subject to any disclaimer, the term of this patent is extended or adjusted under 35 U.S.C. 154(b) by 140 days.

(21) Appl. No.: 14/033,144

(22) Filed: Sep. 20, 2013

(65) Prior Publication Data
US 2014/0093175 A1    Apr. 3, 2014

(30) Foreign Application Priority Data
Sep. 28, 2012    (JP) .............................. 2012-217749

(51) Int. Cl.
*G06K 9/46* (2006.01)
*G06F 17/30* (2006.01)
*G06K 9/00* (2006.01)

(52) U.S. Cl.
CPC .... *G06F 17/30554* (2013.01); *G06F 17/30064* (2013.01); *G06F 17/30274* (2013.01); *G06K 9/00221* (2013.01)

(58) Field of Classification Search
CPC ..... G06Q 10/087; G06Q 10/10; G06Q 50/18; G06Q 50/22; G06Q 20/10; G06Q 30/0264; G06Q 30/0277; G06Q 50/24; G06F 17/30442; G06F 17/30979; G06F 17/30648; G06F 17/30268; G06F 17/30277; G06F 17/3064
USPC ......................................................... 382/195
See application file for complete search history.

(56) References Cited

U.S. PATENT DOCUMENTS 6,513,028 B1 *  1/2003  Lee .................. G06F 17/30327
7,076,765 B1 *  7/2006  Omori .................... G06F 9/455
                                                        717/121

(Continued)

FOREIGN PATENT DOCUMENTS

| JP | 2008-242639 A | 10/2008 |
| JP | 2010-218371 A | 9/2010 |
| JP | 2011-227633 A | 11/2011 |

OTHER PUBLICATIONS

"OMAKASE technology", μ TOUGH-6020, Compact Digital Cameras, Olympus Imaging, http://olympus-imaging.jp/product/compact/mjutough6020/feature/index3.html, Aug. 31, 2012, 2 pages(with partial English translation).

*Primary Examiner* — Stephen R Koziol
*Assistant Examiner* — Shaghayegh Azima
(74) *Attorney, Agent, or Firm* — Oblon, McClelland, Maier & Neustadt, L.L.P.

(57) ABSTRACT

An information processing device that presents at least one of data stored in memory or indexes corresponding to the data; receives a selection of the presented at least one of the data or the indexes corresponding to the data; obtains information related to the selected at least one of the data or the indexes corresponding to the data; generates at least one search key abstracted from the obtained information; searches for data within the memory based on the at least one search key; and presents at least one of the data or indexes corresponding to the data as a search result.

20 Claims, 22 Drawing Sheets

(56) References Cited

U.S. PATENT DOCUMENTS

| | | | | |
|---|---|---|---|---|
| 2005/0131867 A1* | 6/2005 | Wilson | .................... | H04L 45/00 |
| 2007/0041668 A1* | 2/2007 | Todaka | ............. | G06F 17/30247 |
| | | | | 382/306 |
| 2009/0085846 A1* | 4/2009 | Cho | ....................... | G09G 5/363 |
| | | | | 345/87 |
| 2010/0134415 A1* | 6/2010 | Iwase | .................... | G06F 1/1626 |
| | | | | 345/158 |
| 2010/0174741 A1* | 7/2010 | Shinjo | ............... | G06F 17/30625 |
| | | | | 707/769 |
| 2012/0265756 A1* | 10/2012 | Ryan | ................. | G06F 17/30864 |
| | | | | 707/725 |
| 2013/0051776 A1* | 2/2013 | Bowes | ................... | H04N 5/783 |
| | | | | 386/353 |
| 2013/0138638 A1* | 5/2013 | Karenos | ............ | G06F 17/30696 |
| | | | | 707/728 |

* cited by examiner

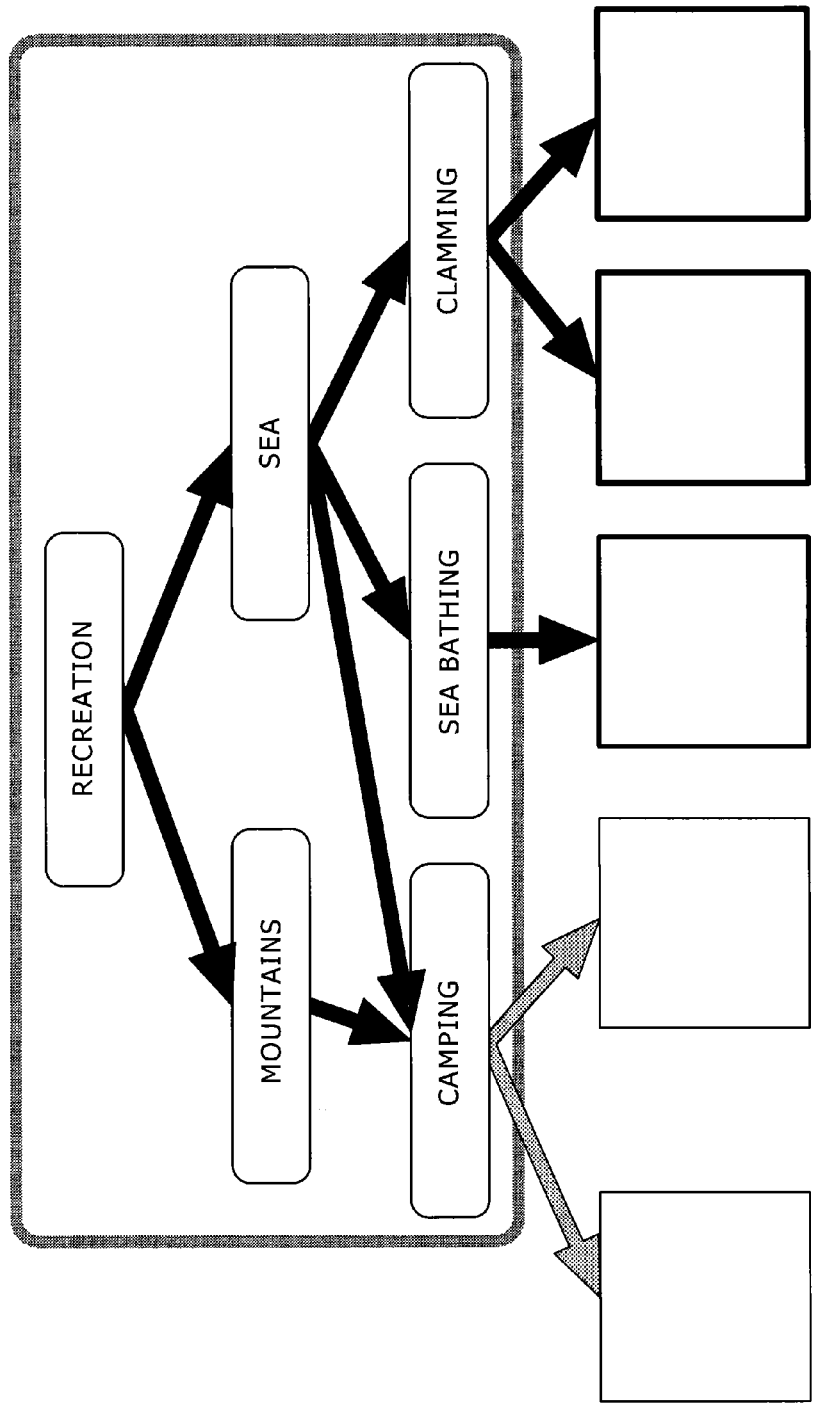

FIG.13

| TAG INFORMATION | SEARCH KEY | EXAMPLES |
|---|---|---|
| PHOTOGRAPHING DATE AND TIME | MONTH | AUGUST |
| | MONTH AND DAY | 24-AUG |
| | DAY OF THE WEEK | SUNDAY |
| | TIME PERIOD | MORNING, NOON, EVENING |
| | SEASON | SPRING, SUMMER, AUTUMN, WINTER |
| | SEASONAL EVENT | NEW YEAR, GW |
| | A DAY'S NUMBER OF PHOTOGRAPHS TAKEN | ONE TO NINE PHOTOGRAPHS/DAY |
| | AGE OF MOON | FULL MOON |
| CAPTURING DATE AND TIME | PHOTOGRAPHS CAPTURED SIMULTANEOUSLY | |
| GPS INFORMATION | SIGHTSEEING SPOT NAME | TOKYO TOWER |
| | CLASSIFICATION | SHRINES AND TEMPLES, SEAS, MOUNTAINS |
| | PLACE NAME | OKINAWA PREFECTURE, TOKYO |
| | TOPOGRAPHY | SANDY BEACH, MOUNTAINTOP |
| FACE RECOGNITION INFORMATION | IDENTICAL PERSONS | |
| | NUMBER OF PIECES | TWO PERSONS, GROUP PHOTOGRAPH |

FIG.14

| TAG INFORMATION ETC. | SEARCH KEY | EXAMPLES |
|---|---|---|
| PHOTOGRAPHING DATE AND TIME | BIRTHDAY | BIRTHDAY OF MS. A |
| BIRTHDAY INFORMATION | | |
| FACE RECOGNITION INFORMATION | | |
| PHOTOGRAPHING DATE AND TIME | AGE | MS. A AT AGE OF SIX |
| BIRTHDAY INFORMATION | | |
| FACE RECOGNITION INFORMATION | | |
| PHOTOGRAPHING DATE AND TIME | ANNIVERSARY | WEDDING ANNIVERSARY |
| ANNIVERSARY INFORMATION | | |
| PHOTOGRAPHING DATE AND TIME | A DAY'S PHOTOGRAPHED PERSONS | MS. A AND MR. B |
| FACE RECOGNITION INFORMATION | | |
| SUBJECT INFORMATION | | |
| PHOTOGRAPHING DATE AND TIME | A DAY'S PHOTOGRAPHING LOCATION | ONE TO NINE PHOTOGRAPHS/LOCATION |
| GPS INFORMATION | | |
| PHOTOGRAPHING DATE AND TIME | EVENT | AA FESTIVAL |
| GPS INFORMATION | | |

INFORMATION PROCESSING SYSTEM, INFORMATION PROCESSING DEVICE, INFORMATION PROCESSING METHOD, AND COMPUTER READABLE RECORDING MEDIUM

CROSS REFERENCE TO RELATED APPLICATIONS

This application claims priority to Japanese Patent Application No. 2012-217749 filed on Sep. 28, 2012, the entire contents of which is incorporated by reference herein.

BACKGROUND OF THE DISCLOSURE

1. Field of the Disclosure

The present disclosure relates to an information processing system for browsing, management, and the like of image files, for example, an information processing device applicable to the system, an information processing method, and a computer readable recording medium.

2. Description of the Related Art

The spread of digital still cameras, digital video cameras, digital audio players, and recording devices for receiving and recording broadcast waves of terrestrial digital television broadcasting has increased opportunity to store, manage, and browse, listen to, and view large amounts of image files, music files, moving image files, and program files at home.

Image files created by imaging with digital still cameras may store information such as a photographing date and time, GPS (Global Positioning System) information, and the like in a format defined by an Exif (Exchangeable image file format) standard. In addition, music files may store information such as the titles of music pieces, the names of artists, the years, months, and days of release, and the like in a format defined by an ID3 tag standard. Further, in a case of terrestrial digital television broadcast waves in Japan, various kinds of information are superimposed and broadcast according to an ISDB-T (Integrated Services Digital Broadcasting-Terrestrial) standard. Thus, the superimposed information can be stored in a program file in which terrestrial digital television broadcast waves are recorded. Hence, image files and the like can be managed on a digital still camera and the like using information stored in the image files and the like (which information will be referred to collectively as "tag information" including the above-described various kinds of information).

"Automatic technology|μTOUGH-6020|compact digital camera|Olympus imaging," retrieved on Aug. 31, 2012, describes techniques for performing search operation on photograph files stored in a built-in memory of a digital still camera using a search key such as a photographing date, a photographing mode, or the like prepared on the camera side in advance, and displaying thumbnails of candidate images as a search result on a liquid crystal monitor.

However, in the conventional techniques described above, the image files are searched using a search key such as a photographing date or the like prepared in advance as a product function of the digital still camera, and thumbnails of candidate images extracted as a search result are displayed on the liquid crystal monitor of the digital still camera. Thus, it is not easy for example to find an image file that a user is paying attention to, or search for image files given tag information related to tag information given to the image file. That is, the conventional techniques require the user to specify, in advance, the tag information of the image file desired to be searched for and viewed (image file obtained by photographing on a certain month and day, for example). Thus, in order to search for image files related to the image file of interest (for example image files obtained by photographing on the same date and time as the image file of interest) with the image file of interest as a key, it is necessary to obtain the tag information given to the image file of interest separately, and perform search operation again using the tag information. Such operation consumes much time of the user.

The present disclosure has been made in view of the above-described problems. It is an object of the present disclosure to provide an information processing system, an information processing device, an information processing method, and an information processing program that make it possible to search for related data easily.

SUMMARY

The present disclosure is applied to an information processing device that presents at least one of data stored in memory or indexes corresponding to the data; receives a selection of the presented at least one of the data or the indexes corresponding to the data; obtains information related to the selected at least one of the data or the indexes corresponding to the data; generates at least one search key abstracted from the obtained information; searches for data within the memory based on the at least one search key; and presents at least one of the data or indexes corresponding to the data as a search result.

BRIEF DESCRIPTION OF THE DRAWINGS

FIG. 12 is a diagram showing an example of a thesaurus used in the information processing system according to the first aspect of the embodiment of the present disclosure;

FIG. 13 is a diagram showing an example of relation between tag information and search keys in the information processing system according to the first aspect of the embodiment of the present disclosure;

FIG. 14 is a diagram showing another example of relation between tag information and search keys in the information processing system according to the first aspect of the embodiment of the present disclosure;

DESCRIPTION OF THE DISCLOSURE

An information processing device according to an embodiment of the present disclosure will hereinafter be described with reference to the drawings.

(First Aspect)

Figure 1:
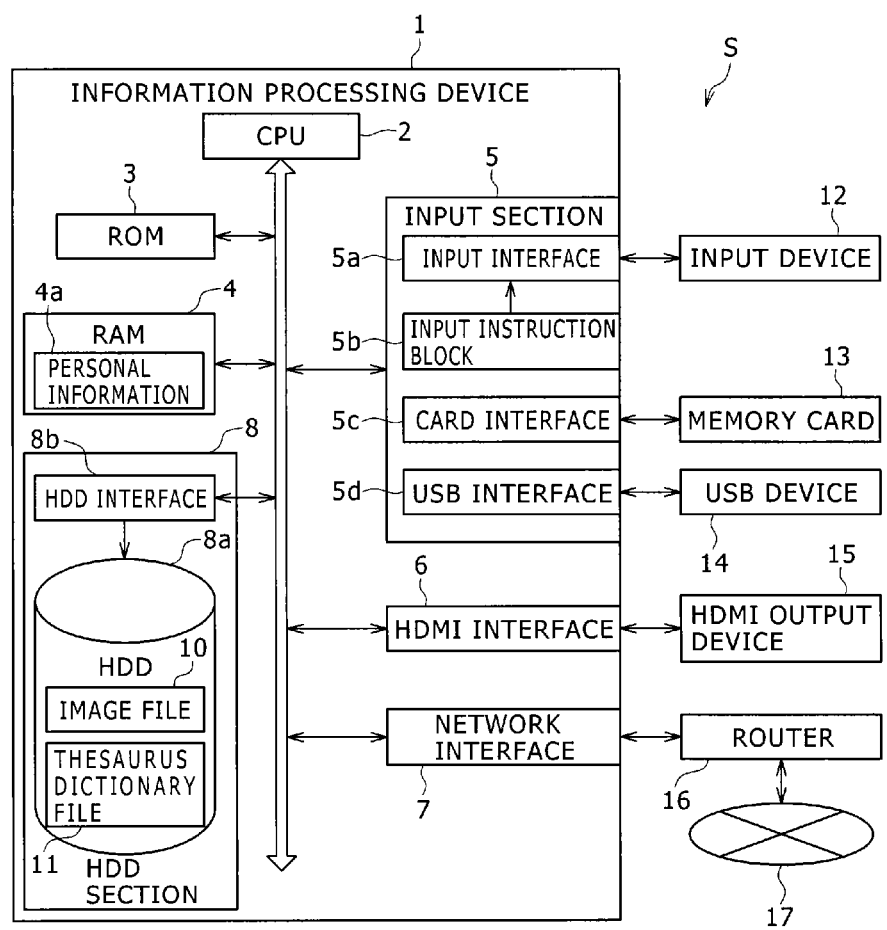
FIG. 1 is a block diagram showing a general configuration of an information processing system according to a first aspect of an embodiment of the present disclosure.

FIG. 1 is a block diagram showing a general configuration of an information processing system S according to a first aspect of an embodiment of the present disclosure. The information processing system S according to the first aspect of the embodiment of the present disclosure in FIG. 1 includes an information processing device 1. The information processing device 1 includes a CPU (Central Processing Unit) 2, a ROM (Read Only Memory) 3, a RAM (Random Access Memory) 4, an input section 5, an HDMI (High-Definition Multimedia Interface) interface (I/F) 6, a network interface (I/F) 7, and an HDD (Hard Disk Drive) section 8, which are connected to each other by a bus.

The CPU 2 is a program control device. The CPU 2 controls the whole of the information processing device 1 by executing a program such as firmware or the like stored in the ROM 3 to be described in the following. The ROM 3 is a kind of computer readable recording medium storing the program such as the firmware or the like on a non-transitory basis. This program is read at a time of a start of the information processing device 1, expanded in the RAM 4, and then executed. The CPU 2 thereby controls the whole of the information processing device 1. Incidentally, this program may be provided in a state of being stored on a computer readable recording medium such as a DVD-ROM or the like on a non-transitory basis, or provided via a network, and stored in the ROM 3.

The RAM 4 functions as a work memory in the information processing device 1. The RAM 4 stores a program, data, and the like used temporarily during the operation of the information processing device 1 including the CPU 2. The RAM 4 also stores, in the form of a table, personal information 4a on a user of the information processing device 1, a family of the user, and the like. The personal information 4a includes for example the birthdays of the user and the family of the user, anniversaries such as a wedding anniversary and the like, information for identifying the photographic subjects of the user and the family, and the like.

The input section 5 includes an input interface (I/F) 5a, an input instruction block 5b, a card interface (I/F) 5c, and a USB (Universal Serial Bus) interface (I/F) 5d. The input interface 5a is connected with the input instruction block 5b and an input device 12. The input interface 5a receives an input signal input by the user by operating the input instruction block 5b or the input device 12. The input instruction block 5b includes for example an image capturing instruction button and the like. The input device 12 includes for example a remote control, a keyboard, a mouse, and the like. The card interface 5c includes a card slot (not shown). The card interface 5c reads/writes data from and to a memory card 13 inserted in the card slot. The form of the memory card 13 is not limited, but includes, as an example, an SD memory card, a miniSD memory card, a microSD memory card, or a memory stick (registered trademark). The USB interface 5d includes a USB connector (not shown). The USB interface 5d reads/writes data from and to a USB device 14 connected to the USB connector directly or via a USB cable (not shown). The USB device 14 includes a USB flash memory, a digital camera including a USB connector, and the like.

The HDMI interface 6 includes an HDMI connector (not shown). The HDMI interface 6 outputs an AV stream (a video signal and an audio signal) to an HDMI output device 15 connected to the HDMI connector via an HDMI cable (not shown). The HDMI output device 15 includes for example a TV (television), a monitor, and the like. The network interface 7 includes a network connector (not shown). A router 16 is connected to the network connector via a network cable (not shown), and the router 16 is connected to a WAN (Wide Area Network) 17 such as the Internet or the like, whereby data is transmitted and received to and from the external network. The network interface 7 performs wire communication based on an IEEE (The Institute of Electrical and Electronics Engineers, Inc.) 802.3 standard. Alternatively, the network interface 7 may perform wireless communication based on an IEEE 802.11 standard. Alternatively, the network interface 7 may perform both of wire communication and wireless communication.

The HDD section 8 includes an HDD (HDD device) 8a and an HDD interface (I/F) 8b. The HDD 8a includes a disk as a recording medium, a rotating section for rotating the disk, and a head section for reading/writing data on the disk (none of the disk, the rotating section, and the head section are shown). When an instruction to read/write data on the HDD 8a is given, the HDD interface 8b controls the whole of the HDD 8a and controls the reading/writing of data, and outputs the read data. In addition, the HDD 8a stores image files 10 provided by the user and a thesaurus dictionary file 11 that, when provided with a specific word, presents a synonym for the word.

The image files 10 are stored on the HDD 8a by an arbitrary method. However, the method includes, as an example, a method of storing the image files 10 in the memory card 13, inserting the memory card 13 into the card slot of the card interface 5c, and capturing the image files 10 stored in the memory card 13 onto the HDD 8a according to an operation of the input instruction block 5b. In addition, the image files 10 may be stored in the USB device 14, the USB device 14 may be inserted into the USB connector of the USB interface 5d, and the image files 10 stored in the USB device 14 may be captured onto the HDD 8a according to an operation of the input instruction block 5b. Further, the image files 10 present on the WAN 17 may be captured onto the HDD 8a via the router 16 and the network interface 7. A detailed configuration of the image files 10 will be described later. Incidentally, while FIG. 1 shows one image file 10, at least a plurality of image files 10 may be stored on the HDD 8a in the first aspect of the embodiment of the present disclosure.

(Data Structure of Image File)

Figure 2:
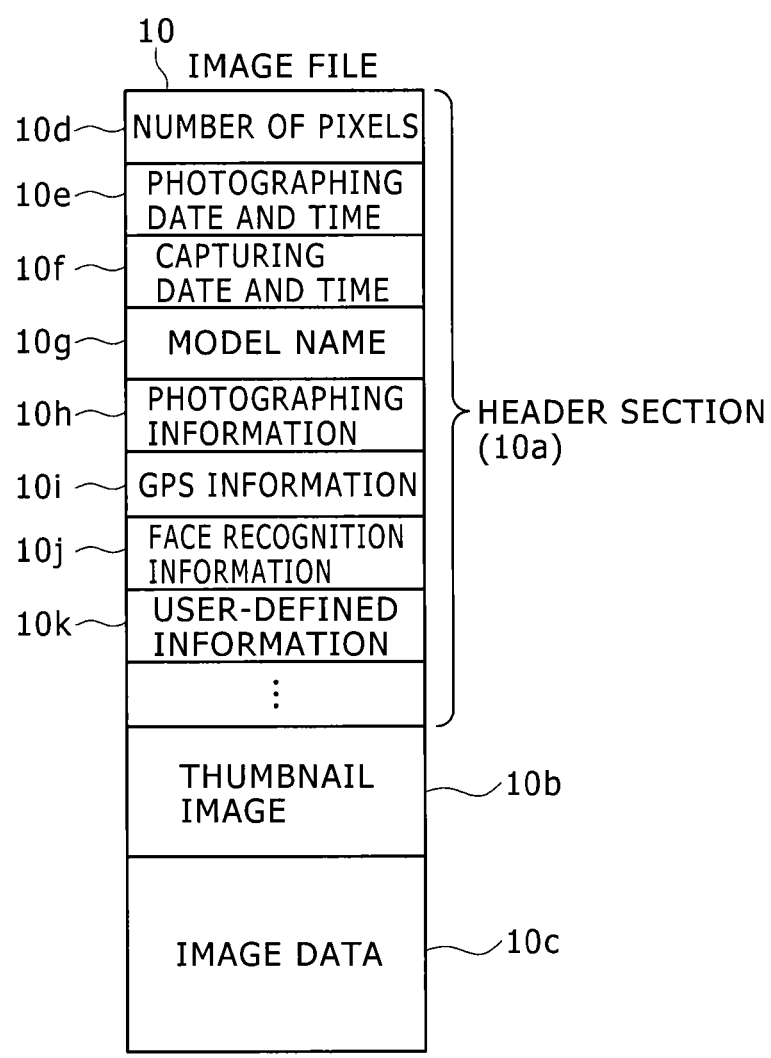
FIG. 2 is a diagram showing an example of a data structure of an image file used in the first aspect of the embodiment of the present disclosure.

FIG. 2 is a diagram showing an example of a data structure of an image file 10 stored on the HDD 8a of the information processing device 1 according to the first aspect of the embodiment of the present disclosure. The image file 10 according to the first aspect of the embodiment of the present disclosure has a file format defined by Exif. The image file 10 has a header section 10a storing tag information, a thumbnail image region 10b storing thumbnail image data, and an image data region 10c storing image data. The tag information stored in the header section 10a of the image file 10 according to the first aspect of the embodiment of the present disclosure is described in a predetermined region of the header section 10a of the image file 10 by a digital still camera not shown in the figures at a time of imaging of a photographic subject.

The header section 10a of the image file 10 includes: a number of pixels region 10d describing the number of pixels of the image data; a photographing date and time region 10e describing the photographing date and time of the image file 10; a capturing date and time region 10f describing the date and time of capturing of the image file 10 into the information processing device 1; a model name region 10g describing the model name of the imaging device (digital still camera or the like) that took the image of the image file 10; a photographing information region 10h describing various kinds of information on the imaging device when the image data of the image file 10 was taken, for example an aperture value and a focal length; a GPS (Global Positioning System) information region 10i describing positional information (for example, latitude, longitude, and altitude information) that indicates the position where the imaging device was located when the image of the image file 10 was taken, the positional information being obtained by a GPS system; a face recognition information region 10j describing information obtained as a result of the information processing device 1 performing face recognition on the image data of the image file 10, for example information for identifying a photographic subject included in the image data; and a user-defined region 10k for the user of the information processing device 1 to describe various kinds of information arbitrarily. The header section 10a of the image file 10 may further include other regions.

The various kinds of information described in each region of the header section 10a will be described by taking an example. The photographing date and time region 10e includes the date and time when the image data of the image file 10 was taken, that is, the photographing date and time. The photographing date and time is obtained by referring to an internal clock of the imaging device. As an example, the information of the photographing date and time is described as "2012/08/24 10:15:24," that is, a year, a month, a day, and a time down to units of seconds. The capturing date and time region 10f includes the date and time when the image data of the image file 10 was captured into the information processing device 1, that is, the capturing date and time. The capturing date and time is obtained by referring to an internal clock not shown in the figures of the information processing device 1. As an example, the capturing date and time is described as "2012/09/01 18:00:58," that is, a year, a month, a day, and a time down to units of seconds. The model name region 10g includes data representing the model name of the imaging device, which model name is determined by the manufacturer of the imaging device. As an example, the data representing the model name is described as "XYZ-P" or the like. The photographing information region 10h includes various kinds of information on the imaging device when the image data of the image file 10 was taken. The information on the imaging device is described as "Aperture Value F=8, Shutter Speed 1/125," for example. The GPS information region 10i describes positional information obtained by using the GPS system as the position where the imaging device was located when the image of the image file 10 was taken. More specifically, as the positional information, latitude information, longitude information, and altitude information of the position where the imaging device was located are described as "lat=+35.00.35.600, lon=+135.41.35.600, alt=50," for example. The face recognition information region 10j describes information obtained as a result of the information processing device 1 performing face recognition on the image data of the image file 10, as information for distinguishing a photographic subject included in the image data. The information obtained as the result of the face recognition is described as "user=0010," for example.

(Functional Configuration of Information Processing System)

Figure 3:
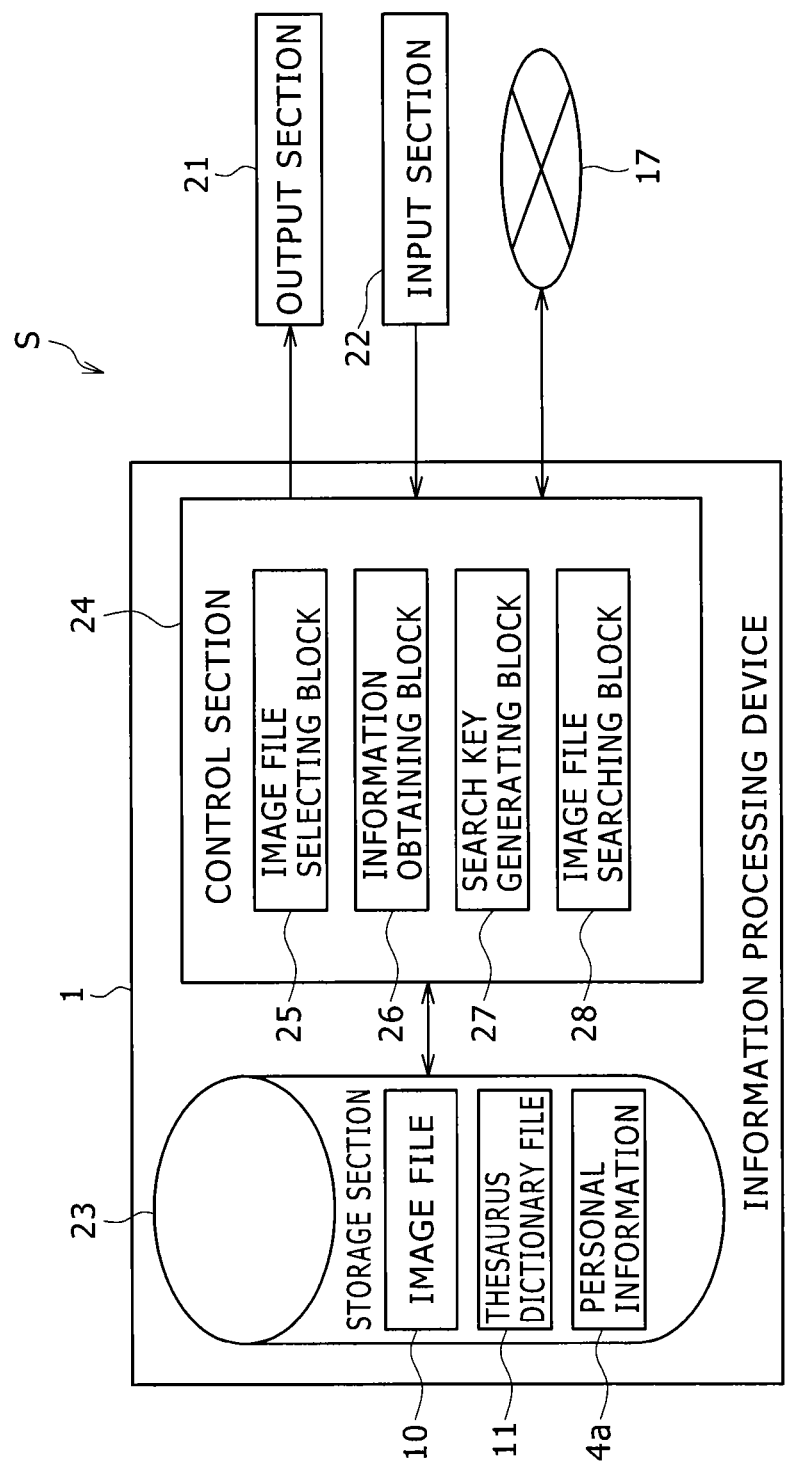
FIG. 3 is a functional block diagram showing a functional configuration of the information processing system according to the first aspect of the embodiment of the present disclosure.

FIG. 3 is a functional block diagram showing a functional configuration of the information processing system S according to the first aspect of the embodiment of the present disclosure. As shown in FIG. 3, the information processing system S according to the first aspect of the embodiment of the present disclosure includes the information processing device 1, an output section 21, and an input section 22.

The information processing device 1 includes a storage section 23 and a control section 24. The storage section 23 stores various kinds of data and files at least on a temporary basis. The data and the files are read from the storage section 23, or data and files are written to the storage section 23, according to an instruction from the control section 24. The storage section 23 stores the image files 10, the thesaurus dictionary file 11, and the personal information 4a. Details of the image files 10, the thesaurus dictionary file 11, and the personal information 4a are as described above (see FIG. 1 and FIG. 2).

The control section 24 controls the whole of the information processing device 1. The control section 24 includes an image file selecting block 25, an information obtaining block 26, a search key generating block 27, and an image file searching block (data searching block) 28.

When the image data of image files 10 stored in the storage section 23 is displayed by the output section 21, and at least one piece of image data of the image data displayed by the output section 21 is selected by the input section 22, the image file selecting block 25 receives an image data selection signal output from the input section 22, and retrieves and identifies the image file 10 corresponding to the image data selection signal from the image files 10 stored in the storage section 23. In addition, when the output section 21 displays the image data of image files 10 stored in the storage section 23, the image file selecting block 25 may obtain pieces of information related to at least a part of the image files 10 stored in the storage section 23, and further select the image files 10 to be displayed by the output section 21 such that the obtained pieces of information of at least the part of the image files 10 are different from each other. Incidentally, suppose in this case that the image data also includes thumbnail image data as indexes of the image data, which thumbnail image data is stored in the thumbnail image regions 10b of the image files 10.

More specifically, the image file selecting block 25 obtains tag information described in each region of the header sections 10a of the image files 10 stored in the storage section 23, calculates the frequency of the tag information, and sets a low weight to image files 10 having tag information of a high frequency. As an example, the image file selecting block 25 calculates the frequency of photographing date and time tag information described in the photographing date and time regions 10e, and when there are a large number of image files 10 having the same photographing date and time tag information, the image file selecting block 25 sets a low weight to the image files 10. The image file selecting block 25 then selects image files 10 to be displayed in such a manner as to equalize weights as much as possible. Thereby, when the image file selecting block 25 makes the output section 21 display the image data of image files 10, the image file selecting block 25 can perform control so as to prevent image files 10 having specific tag information from being displayed in a concentrated manner.

The information obtaining block 26 obtains information related to image files 10 identified by the control section 24, which image files 10 include the image files 10 identified by the image file selecting block 25. The information obtained by the information obtaining block 26 includes information described in each region of the header sections 10a of the image files 10. Other information obtained by the information obtaining block 26 includes for example thesaurus information obtained by providing the information described in each region of the header sections 10a of the image files 10 to the thesaurus dictionary file 11 stored in the storage section 23 as well as information obtained by providing the information described in each region of the header sections 10a of the image files 10 to the WAN 17.

The search key generating block 27 uses at least one piece of the information related to the image files 10, which information is obtained by the information obtaining block 26, to generate at least one search key, or preferably a plurality of search keys, which search key or search keys are abstracted from the obtained information. The "abstraction" from the obtained information includes for example:

using for example a part of the obtained information as a search key without using the obtained information itself as a search key;

using, as a search key, thesaurus information obtained by providing the obtained information to the thesaurus dictionary file 11 stored in the storage section 23;

when the obtained information is numerical value information, using a search key indicating a range of the numerical value information;

using a search key indicating the number of data corresponding to information with which at least part of the obtained information coincides;

using photographic subject distinguishing information itself described in the face recognition information region 10j as a search key;

using information identifying a photographic subject (for example the name of the photographic subject) using the photographic subject distinguishing information and the personal information 4a as a search key; and using data obtained by providing the obtained information to the WAN 17 and using a knowledge base or the like as a search key.

The search key generating block 27 may further use the obtained information itself as search keys in addition to the abstracted search keys.

The search key generating block 27 then makes the output section 21 display at least the one generated search key, or preferably the plurality of generated search keys. At this time, in consideration of the convenience of the user, at least a part of the image files 10 stored in the storage section 23 may be searched using the generated search key, and an image file 10 as a result of the search based on the search key and the search key may be displayed in association with each other. In addition, the search key generating block 27 can make the search key fuzzy by setting a predetermined range to the generated search key.

In addition, when the search key generating block 27 receives a search key fine adjustment input instruction signal from the user via the input section 22, the search key generating block 27 may generate a search key finely adjusted according to the fine adjustment input instruction signal, and make the output section 21 display the search key. In addition, at least a part of the image files 10 stored in the storage section 23 may be searched using the finely adjusted search key, and an image file 10 as a result of the search based on the search key and the search key may be displayed in association with each other. In addition, the search key generating block 27 may preferentially generate a search key that has been used for the image file searching block 28 to identify an image file 10. An examples of search keys will be described later.

When at least one of search keys displayed by the output section 21 is selected by the input section 22, the image file searching block 28 receives a search key selection signal output from the input section 22, and searches for image files 10 stored in the storage section 23 using the selected search key. The image file searching block 28 then makes the output section 21 display at least one piece of image data of the image files 10 as a search result. In addition, when a plurality of search keys displayed by the output section 21 are selected by the input section 22, the image file searching block 28 receives a plurality of search key selection signals output from the input section 22, searches for image files 10 as a union of sets or a product set of search results based on the plurality of search keys or further a set as a combination of at least two of unions of sets and product sets of the search results based on the plurality of search keys, and makes the output section 21 display at least one piece of image data of the image files 10 as the search results.

The input section 22 receives various kinds of inputs by the user, and transmits input instruction signals corresponding to the inputs to the information processing device 1, preferably in such a manner as to be operatively associated with display by the output section 21. The output section 21 makes various kinds of display on a display screen of the output section 21 on the basis of a display signal transmitted from the information processing device 1.

Details of operation of the information processing device 1, the output section 21, and the input section 22 will be described later. Incidentally, in the above description, the input section 22 includes the input instruction block 5b and the input device 12, the output section 21 includes the HDMI output device 15, the storage section 23 includes the RAM 4 and the HDD 8a, and the control section 24 includes the CPU 2, the input interface 5a, the HDMI interface 6, the network interface 7, and the HDD interface 8b.

(Details of Search Key)

Search keys used in the information processing system S according to the first aspect of the embodiment of the present disclosure will next be described with reference to FIG. 13 and FIG. 14. The search keys to be described in the following are generated mainly by the search key generating block 27, as already described.

FIG. 13 is a diagram showing an example of relation between the tag information described in the header section 10a of an image file 10 and search keys generated from the tag information. In the example shown in FIG. 13, a plurality of search keys are generated from one piece of tag information.

For example, the search key generating block 27 generates search keys such as a "month," a "month and day," a "day of the week," and the like from photographing date and time tag information described in the photographing date and time region 10e. As described above, the photographing date and time tag information described in the photographing date and time region 10e is described as a year, a month, a day, and a time down to units of seconds, that is, numerical value information such for example as "2012/08/24 10:15:24." Thus, the search key generating block 27 generates the search keys such as the "month," the "month and day," the "day of the week," and the like by abstracting the search keys using a part of the photographing date and time tag information. Similarly, the search key generating block 27 generates search keys such as a "time period," a "season," and a "seasonal event," and the like from the photographing date and time tag information described in the photographing date and time region 10e. The search key generating block 27 forms these search keys such as the "time period," the "season," and the "seasonal event," and the like by abstracting the search keys in forms indicating ranges of the photographing date and time tag information. In this case, as for the "seasonal event" search key, GW (Golden Week) holidays, for example, include national holidays falling on different days each year, and the GW holidays can be recognized as including holidays such as Saturday and Sunday. Thus, in generating the "seasonal event" search key, a range is set in consideration of national holidays and other holidays of each year or the like. Further, the search key generating block 27 generates search keys such as a "day's number of photographs taken" and the like from the photographing date and time tag information described in the photographing date and time region 10e. The search key generating block 27 generates the search keys such as the "a day's number of photographs taken" and the like by abstracting the search keys in forms indicating a range of the number of photographs as a result of searching the image files 10 stored in the storage section 23 using a part of the photographing date and time tag information (information on the year, month, and day in the case of the "a day's number of photographs taken").

In addition, the search key generating block 27 generates search keys such as a "sightseeing spot name," a "classification," a "place name," and the like from positional tag information described in the GPS information region 10i. As described above, the positional tag information described in the GPS information region 10i is described as latitude information, longitude information, and altitude information such for example as "lat=+35.00.35.600, lon=+135.41.35.600, alt=50." Thus, the search key generating block 27 generates the search keys such as the "sightseeing spot name," the "classification," the "place name," and the like by inquiring of an external server located on the WAN 17, or for example a map server or a server that accumulates information on sightseeing spots, about the latitude information, the longitude information, and the altitude information, obtaining the name of a landmark having the latitude information, the longitude information, and the altitude information, and performing abstraction using the name itself of the landmark or further using the classification of the landmark or the name of a place where the landmark is located on the basis of the name of the landmark.

Further, the search key generating block 27 generates search keys such as "identical persons," a "number of pieces," and the like from photographic subject distinguishing tag information described in the face recognition information region 10j. As described above, the photographic subject distinguishing tag information described in the face recognition information region 10j is described as information for identifying a photographic subject present within the image data of the image file 10, such for example as "user=0010." Thus, the name of the photographic subject can be identified by checking the photographic subject distinguishing tag information against information within the personal information 4a. Then, the search key generating block 27 generates this subject identifying information itself as a search key (displayed as "Ms. A," for example), and generates a search key by performing abstraction as to how many pieces of subject identifying information are present within the image data of the same image file 10.

FIG. 14 is a diagram showing another example of relation between the tag information described in the header section 10a of an image file 10 and search keys generated from the tag information. In the example shown in FIG. 14, a plurality of search keys are generated from a plurality of pieces of tag information or the tag information and other information.

For example, the search key generating block 27 generates search keys such as a "birthday," an "age," and the like from photographing date and time tag information described in the photographing date and time region 10e, subject distinguishing tag information described in the face recognition information region 10j, and subject identifying information and birthday information described in the personal information 4a. For example, as for the "birthday" search key, the name of a photographic subject within the image data of the image file 10 can be identified by the photographic subject distinguishing tag information and the photographic subject identifying information, and further the birthday of the photographic subject within the image data of the image file 10 can be identified by the name of the photographic subject and the birthday information. Then, the search key generating block 27 can generate the "birthday" search key by abstracting the "birthday" search key as a key for searching for an image file 10 including a month and day within the photographing date and time tag information of the image file 10 which month and day coincides with the month and day of the birthday of the photographic subject, that is, an image file 10 including a part of the photographing date and time tag information of the image file 10 which part coincides with the month and day of the birthday of the photographic subject. In addition, the search key generating block 27 can generate the "age" search key by abstracting the "age" search key as a key for searching for a year, month, and day of photographing date and time tag information which year, month, and day falls within a range of one year from the year, month, and day of the birthday of the photographic subject that reached a specific age, the year, month, and day of the birthday of the photographic subject that reached the specific age being obtained by adding a predetermined number of years to the month and day of the birthday of the photographic subject.

In addition, the search key generating block 27 generates search keys such as an "anniversary" and the like from the photographing date and time tag information described in the photographing date and time region 10e and anniversary information described in the personal information 4a. For example, the search key generating block 27 can generate the "anniversary" search key by abstracting the "anniversary" search key as a key for searching for an image file 10 including a month and day within the photographing date and time tag information of the image file 10 which month and day coincides with the month and day of the anniversary information.

Further, the search key generating block 27 generates search keys such as a "an each day's photographed persons" and the like from the photographing date and time tag information described in the photographing date and time region 10e, the photographic subject distinguishing tag information described in the face recognition information region 10j, and the photographic subject identifying information described in the personal information 4a. For example, as for the "an each day's photographed persons" search key, the name of a photographic subject within the image data of the image file 10 can be identified by the photographic subject distinguishing tag information and the photographic subject identifying information. Then, the search key generating block 27 can generate the "an each day's photographed persons" search key by abstracting the "an each day's photographed persons" search key as a key for searching for an image file 10 including a year, month, and day within the photographing date and time tag information of the image file 10 which year, month, and day coincides with a specific year, month, and day and further having the name of the specific subject present in the image data of the image file 10.

The search key generating block 27 generates search keys such as a "an each day's photographing location," an "event," and the like from the photographing date and time tag information described in the photographing date and time region 10e and positional tag information described in the GPS information region 10i. For example, as for the "an each day's photographing location" search key, the search key generating block 27 inquires of the external server located on the WAN 17 about the latitude information, the longitude information, and the altitude information of the positional tag information described in the GPS information region 10i. An example of the external server is a map server or a server that accumulates information on sightseeing spots. The search key generating block 27 obtains the name of a landmark identified by the latitude information, the longitude information, and the altitude information of the positional tag information described in the GPS information region 10i from the server. The search key generating block 27 can generate the "an each day's photographing location" search key by abstracting the "an each day's photographing location" search key in a form indicating a range of the number of photographs of image files 10 to be found as a result of a search using a search key for searching the storage section 23 for the image files 10 including the latitude information, the longitude information, and the altitude information of the positional tag information described in the GPS information regions 10i of the image files 10 which latitude information, longitude information, and altitude information coincide with the latitude information, the longitude information, and the altitude information of the landmark whose landmark name is obtained and including a year, month, and day within the photographing date and time tag information of the image files 10 which year, month, and day coincides with a specific year, month, and day (performing abstraction so as to indicate "one to nine photographs at the location of a certain landmark," for example).

In addition, as for the "event" search key, the search key generating block 27 inquires of the external server located on the WAN 17 about the latitude information, the longitude information, and the altitude information of the positional tag information described in the GPS information region 10i and the year, month, and day within the photographing date and time tag information. An example of the external server is a server that accumulates information on sightseeing spots. The search key generating block 27 obtains, from the server, information indicating what event was held on the year, month, and day within the photographing date and time tag information at a landmark identified by the latitude information, the longitude information, and the altitude information of the positional tag information described in the GPS information region 10i. The search key generating block 27 can generate the "event" search key by abstracting, as a key for searching for an image file 10 related to the specific event, a key for searching for an image file 10 including the latitude information, the longitude information, and the altitude information of the positional tag information described in the GPS information region 10i of the image file 10 which latitude information, longitude information, and altitude information coincide with the latitude information, the longitude information, and the altitude information of the landmark and including a year, month, and day within the photographing date and time tag information of the image file 10 which year, month, and day coincides with the specific year, month, and day.

As already described, search keys created on the basis of the tag information described in each region of the header section 10a of the image file 10 can be made fuzzy by setting a predetermined range to the search keys. As an example, when the "month and day" search key is "September 1," image files 10 having photographing date and time tag information in ranges of up to three days before and after September 1 can also be searched for on the basis of the "September 1" search key. In addition, when the "time period" search key is "early afternoon," image files 10 having photographing date and time tag information in ranges from 12 a.m. up to four hours before and after 12 a.m. can also be searched for on the basis of the "early afternoon" search key. Further, when the "a day's number of photographs taken" search key is "30 photographs/day," 24 to 36 image files 10 having a specific year, month, and day in photographing date and time tag information of the image files 10 can also be searched for on the basis of "30 photographs/day." Further, when the "place name" search key is "Tokyo," image files 10 having positional tag information belonging to the vicinities of Tokyo Metropolis, or for example cities, towns, and villages adjacent to Tokyo Metropolis in Kanagawa Prefecture, Saitama Prefecture, and Chiba Prefecture can also be searched for on the basis of the "Tokyo" search key.

Making a search key fuzzy will be described below in more detail. The information processing device 1 according to the first aspect of the embodiment of the present disclosure first checks whether an order can be set to tag information to be made fuzzy. For example, an order in one direction along a time axis or an order having the periodicity of days of the week can be set to the photographing date and time tag information described in the photographing date and time region 10e. In addition, an order such as an ascending order or a descending order of numerical values of latitude information or longitude information can be set to the positional tag information described in the GPS information region 10i. Next, the information processing device 1 makes the search key fuzzy by setting a certain range along this order to the tag information to which the order can be set. At this time, not only may a simple range specification be made for the tag information to which the order is set but also a range may be set to the tag information to which the order is set by referring to the thesaurus dictionary file 11 or the like. Specifically, when the "place name" search key is a key related to a specific station on the Yamanote Line (a railway in Tokyo), for example "Shinjuku Station," image files 10 having positional tag information corresponding to "Shin-Okubo Station" and "Yoyogi Station" adjacent to Shinjuku Station on the Yamanote Line can also be searched for on the basis of the "Shinjuku Station" search key by referring to the thesaurus dictionary file 11 or the like.

Further, the information processing device 1 may make the search key fuzzy by setting a range to the tag information using other tag information. For example, when the "month and day" search key is "September 1," the information processing device 1 can search for image files 10 whose photographing date and time tag information is around September 1, select 30 image files 10 before September 1 and 30 image files 10 on and after September 1 among the image files 10 falling on September 1 and before and after September 1 on the time axis with September 1 as a center, and set these image files 10 as a search result based on the "September 1" search key. Further, the information processing device 1 can set a group to a vicinity of specific tag information, and search for image files 10 included in the group on the basis of a specific search key. For example, when the "month and day" search key is "September 1," the information processing device 1 searches for image files 10 whose photographing date and time tag information is around September 1, and creates a behavioral model of a photographer of the image files 10. Then, the information processing device 1 can estimate a period during which the photographer took photographs intensively (which period is generally tied to a specific behavior such as during travel, for example) from the behavioral model of the photographer by using a method such as a hidden Markov model, for example, and set image files 10 present within this period as a search result based on the "September 1" search key.

In addition, as for making search keys fuzzy, for example a button for displaying fuzzy search keys may be provided on a search key display screen 30c to be described later, and the search key generating block 27 may generate fuzzy search keys when this button is selected by the input section 22, or when there are a smaller number than a predetermined number of image files 10 that can be searched for on the basis of a search key generated by the search key generating block 27 at a time of search processing, for example, the search key generated by the search key generating block 27 may be made fuzzy.

(Operation of Information Processing System)

An outline of operation of the information processing system S according to the first aspect of the embodiment of the present disclosure will next be described centering on the display screen of the output section 21 with reference to FIGS. 4 to 12.

Figure 4:
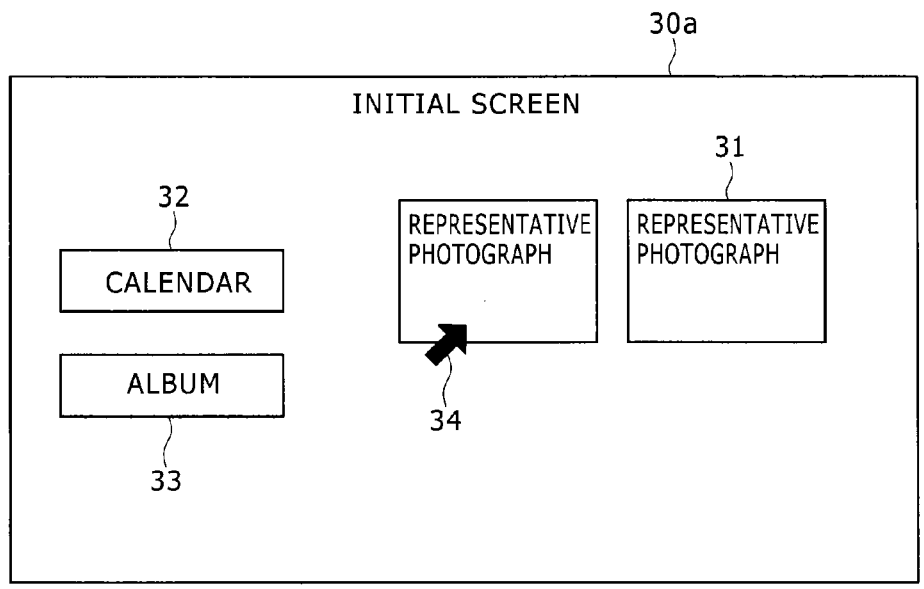
FIG. 4 is a diagram showing an example of an initial screen displayed in the information processing system according to the first aspect of the embodiment of the present disclosure.

FIG. 4 is a diagram showing an initial screen 30a of the information processing system S which initial screen 30a is displayed on the display screen of the output section 21. A display screen showing the initial screen 30a displays buttons 31 (two buttons 31 in the example shown in FIG. 4) for making a transition to a photograph data viewing mode. Similarly, the display screen showing the initial screen 30a displays a button 32 for making a transition to a calendar mode and a button 33 for making a transition to an album mode.

In this case, the calendar mode refers to a mode in which the image data of image files 10 stored in the storage section 23 are arranged in order of years, months, and days to allow the image data of the image files 10 to be viewed as if a calendar were viewed. The album mode refers to a mode in which only image data having album tag information ("athletic meet in 2012," for example) given by the user in advance, which image data is included in the image data of the image files 10 stored in the storage section 23, can be extracted and viewed. Detailed description of the calendar mode and the album mode will be omitted.

Image data representative of the image data of the image files 10 stored in the storage section 23 is displayed in a state of being superimposed on the buttons 31 for making a transition to the photograph data viewing mode. It suffices to randomly extract the image data of arbitrary image files 10 stored in the storage section 23 as image data to be superimposed on the buttons 31. However, the image data of image files 10 stored in the storage section 23 may be searched for on the basis of representative search keys in advance, and extracted so that display of duplicate image data that may be searched for on the basis of an identical search key is prevented as much as possible.

The display screen showing the initial screen 30a displays a pointer 34 indicating a position input by the user. The user moves the pointer 34 within the display screen by the input section 22 such as a remote control, a mouse, and the like, and operates the input section 22 with at least a part of the pointer 34 displayed in a state of being superimposed on one of the buttons 31 to 33 desired to be selected. A selection input signal indicating the button selected by the user is thereby output from the input section 22, and input to the information processing device 1.

Figure 5:
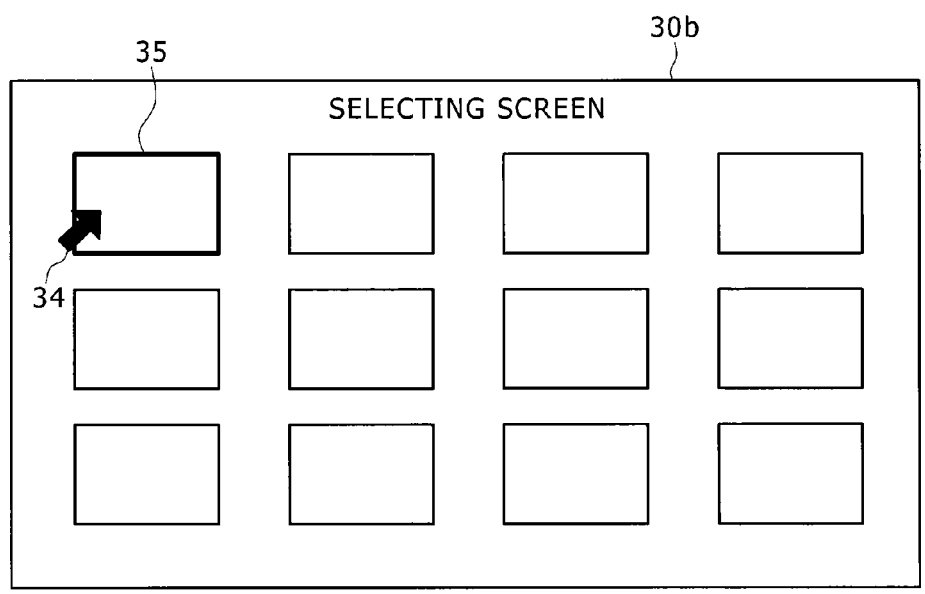
FIG. 5 is a diagram showing an example of a selecting screen displayed in the information processing system according to the first aspect of the embodiment of the present disclosure.

FIG. 5 is a diagram showing a selecting screen 30b of the information processing system S, which selecting screen is displayed on the display screen of the output section 21. The selecting screen 30b shown in FIG. 5 is displayed when the user selects a button 31 for making a transition to the photograph data viewing mode in FIG. 4.

A display screen showing the selecting screen 30b displays a plurality of thumbnail images 35 of image data of image files 10 stored in the storage section 23. In the example shown in FIG. 5, the thumbnail images 35 are displayed in a form of three rows by four columns. However, the number of thumbnail images 35 and the form of display of the thumbnail images 35 are not limited as long as a plurality of thumbnail images 35 are displayed on the display screen.

It suffices to randomly extract the image data of arbitrary image files 10 stored in the storage section 23 and display the thumbnail images of the image data of the image files 10 as the thumbnail images 35 displayed on the display screen showing the selecting screen 30b. However, the image data of image files 10 stored in the storage section 23 may be searched for on the basis of representative search keys in advance, and extracted so that display of duplicate thumbnail images of image data that may be searched for on the basis of an identical search key is prevented as much as possible.

The display screen showing the selecting screen 30b also displays the pointer 34 indicating the position input by the user. The user moves the pointer 34 within the display screen by the input section 22, and operates the input section 22 with at least a part of the pointer 34 displayed in a state of being superimposed on a thumbnail image 35 desired to be selected. A selection input signal indicating the thumbnail image 35 selected by the user (thumbnail image 35 indicated by a thick frame in the example shown in FIG. 5) is thereby output from the input section 22, and input to the information processing device 1.

Figure 6:
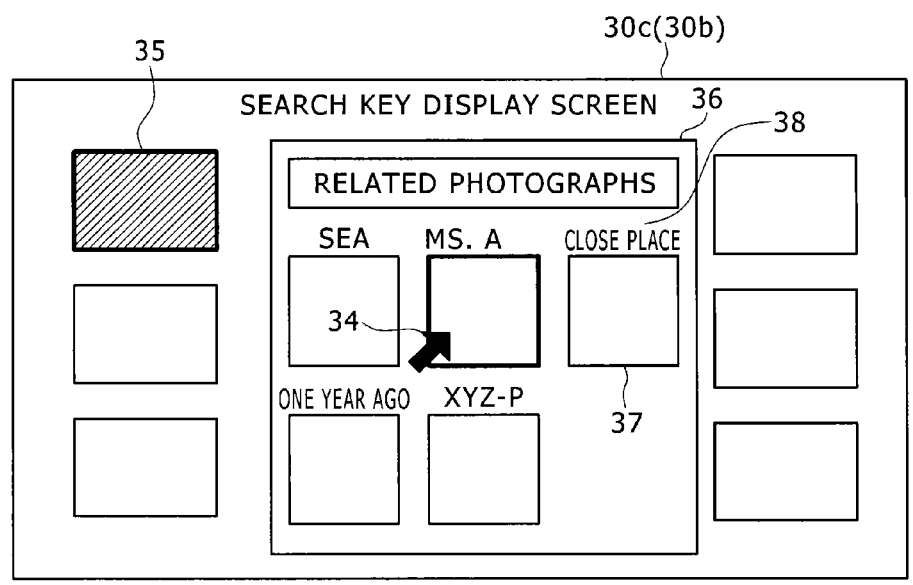
FIG. 6 is a diagram showing an example of a search key display screen displayed in the information processing system according to the first aspect of the embodiment of the present disclosure.

FIG. 6 is a diagram showing a search key display screen 30c of the information processing system S, which search key display screen 30c is displayed on the display screen of the output section 21. The search key display screen 30c shown in FIG. 6 is displayed when the user selects one of the thumbnail images 35 in FIG. 5.

A display screen showing the search key display screen 30c is formed by superimposing and displaying a related photograph window 36 on the display screen showing the selecting screen 30b as shown in FIG. 5. The related photograph window 36 displays a plurality of sets of thumbnail images 37 of image files 10 related to the image file 10 corresponding to the thumbnail image 35 selected in FIG. 5 (thumbnail image 35 hatched in FIG. 6) and search keys 38 used when the thumbnail images 37 are extracted. In the example shown in FIG. 6, five sets of thumbnail images 37 and search keys 38 are displayed. However, the number of sets of thumbnail images 37 and search keys 38 and the form of display of the sets of the thumbnail images 37 and the search keys 38 are not limited as long as a plurality of sets of thumbnail images 37 and search keys 38 are displayed on the display screen.

The sets of the thumbnail images 37 and the search keys 38 displayed on the related photograph window 36 are selected as appropriate from search keys generated referring to tag information described in each region of the header section 10a of the image file 10 corresponding to the thumbnail image 35 selected in FIG. 5 and the thumbnail images of image files 10 as a search result obtained by searching the image files 10 stored in the storage section 23 on the basis of the search keys.

As an example, a "sea" search key is an example of a "classification" search key, and is generated from positional tag information described in the GPS information region 10i. In addition, a "Ms. A" search key is generated from subject distinguishing tag information described in the face recognition information region 10j and subject identifying information described in the personal information 4a. Further, a "close place" search key is generated as a search key for searching for an image file 10 having positional tag information indicating a vicinity (within a radius of 50 m, for example) of the positional tag information described in the GPS information region 10i, on the basis of the positional tag information described in the GPS information region 10i. Further, an "year ago" search key is generated as a search key for searching for an image file 10 having a value obtained by subtracting one from only the year in the year, month, and day within the photographing date and time tag information described in the photographing date and time region 10e (that is, a value indicating a year ago), on the basis of the photographing date and time tag information described in the photographing date and time region 10e. Then, an "XYZ-P" search key is generated as a search key for searching for an image file 10 having model name tag information "XYZ-P" described in the model name region 10g of the image file 10.

In this case, as described above, a plurality of search keys can be generated by referring to the tag information described in each region of the header section 10a of the image file 10 corresponding to the thumbnail image 35 selected in FIG. 5. Thus, arbitrary search keys 38 are selected from the plurality of search keys and displayed. However, it is possible to display as many search keys of different kinds as possible or as many search keys generated by using different tag information as possible from a viewpoint of displaying sets of thumbnail images 37 and search keys 38 from different viewpoints for the user.

The display screen showing the search key display screen 30c also displays the pointer 34 indicating the position input by the user. The user moves the pointer 34 within the display screen by the input section 22, and operates the input section 22 with at least a part of the pointer 34 displayed in a state of being superimposed on a thumbnail image 37 desired to be selected. A selection input signal indicating the thumbnail image 37 selected by the user (thumbnail image 37 indicated by a thick frame in the example shown in FIG. 6) is thereby output from the input section 22, and input to the information processing device 1.

Figure 7:
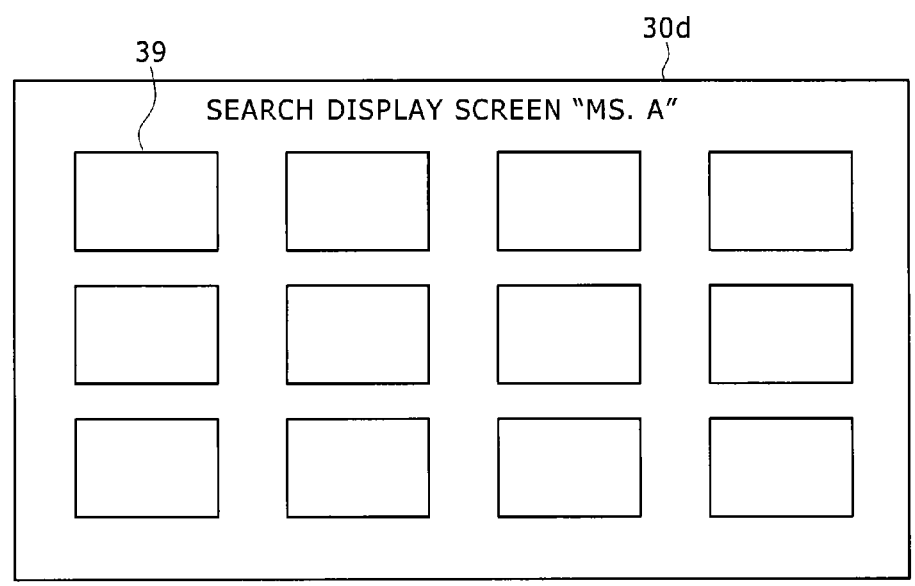
FIG. 7 is a diagram showing an example of a search display screen displayed in the information processing system according to the first aspect of the embodiment of the present disclosure.

FIG. 7 is a diagram showing a search display screen 30d of the information processing system S, which search display screen 30d is displayed on the display screen of the output section 21. The search display screen 30d shown in FIG. 7 is displayed when the user selects one of the thumbnail images 37 in FIG. 6.

A display screen showing the search display screen 30d displays thumbnail images 39 of image data of image files 10 as a search result obtained by searching the image files 10 stored in the storage section 23 using the search key 38 forming a set with the thumbnail image 37 selected in FIG. 6. In the example shown in FIG. 7, the thumbnail images 39 are displayed in a form of three rows by four columns. However, the number of thumbnail images 39 displayed on the display screen is determined depending on the search result, and it is not necessary to display the thumbnail images 39 of the image files 10 as all of the search result. In addition, the form of display of the thumbnail images 39 is not limited. Another display form different from that of FIG. 7 will be described with reference to FIG. 8.

Figure 8:
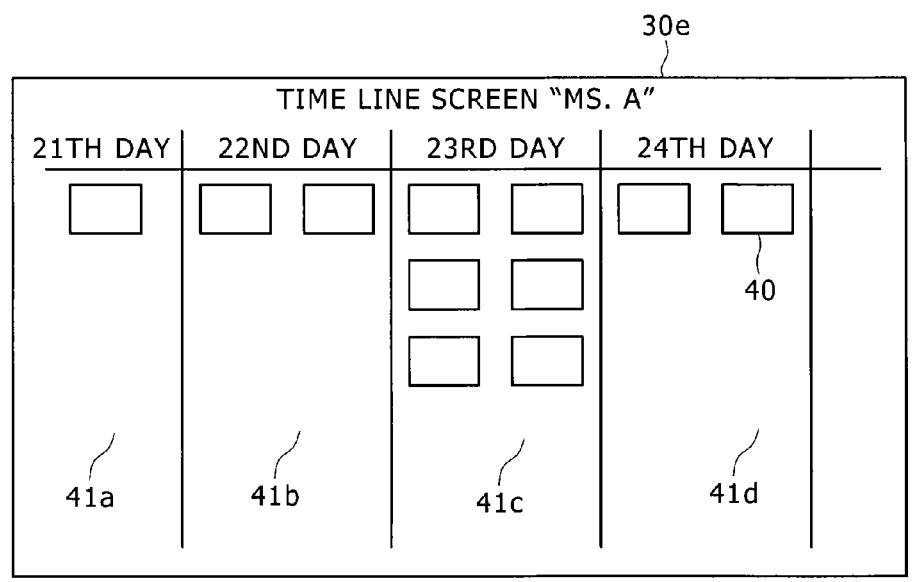
FIG. 8 is a diagram showing an example of a time line screen displayed in the information processing system according to the first aspect of the embodiment of the present disclosure.

FIG. 8 is a diagram showing a time line screen 30e of the information processing system S, which time line screen 30e is displayed on the display screen of the output section 21. The time line screen 30e shown in FIG. 8 is displayed when the user selects one of the thumbnail images 37 in FIG. 6.

A display screen showing the time line screen 30e displays thumbnail images 40 of image data of image files 10 as a search result obtained by searching the image files 10 stored in the storage section 23 using the search key 38 forming a set with the thumbnail image 37 selected in FIG. 6. The display screen of FIG. 8 is different from the display screen of FIG. 7 in that the thumbnail images 39 are not arranged according to particular arrangement order on the display screen of FIG. 7, or even if the thumbnail images 39 have particular arrangement order, the arrangement order is difficult to distinguish from the display screen, whereas the thumbnail images 40 are arranged on the display screen of FIG. 8 such that the photographing dates and times indicated by the photographing date and time tag information of the image files 10 corresponding to the thumbnail images 40 progress from a left to a right along a time axis.

More specifically, a thumbnail image 40 whose year, month, and day in photographing date and time tag information is Y 21, X (X and Y are natural numbers indicating an arbitrary year and an arbitrary month, respectively, and "21" represents a number of a day) is arranged in a first region 41a of the display screen. Thumbnail images 40 whose year, month, and day in photographing date and time tag information is Y 22, X (the day after Y 21, X) are arranged in a second region 41b of the display screen. Thumbnail images 40 whose year, month, and day in photographing date and time tag information is Y 23, X (the day after Y 22, X) are arranged in a third region 41c of the display screen. Thumbnail images 40 whose year, month, and day in photographing date and time tag information is Y 24, X (the day after Y 23, X) are arranged in a fourth region 41d of the display screen. This makes it possible to grasp, on the time axis, the thumbnail images 40 of the image files 10 as the result of the search based on the search key 38 corresponding to the selected thumbnail image 37, and thus improve the convenience of the user.

Figure 9:
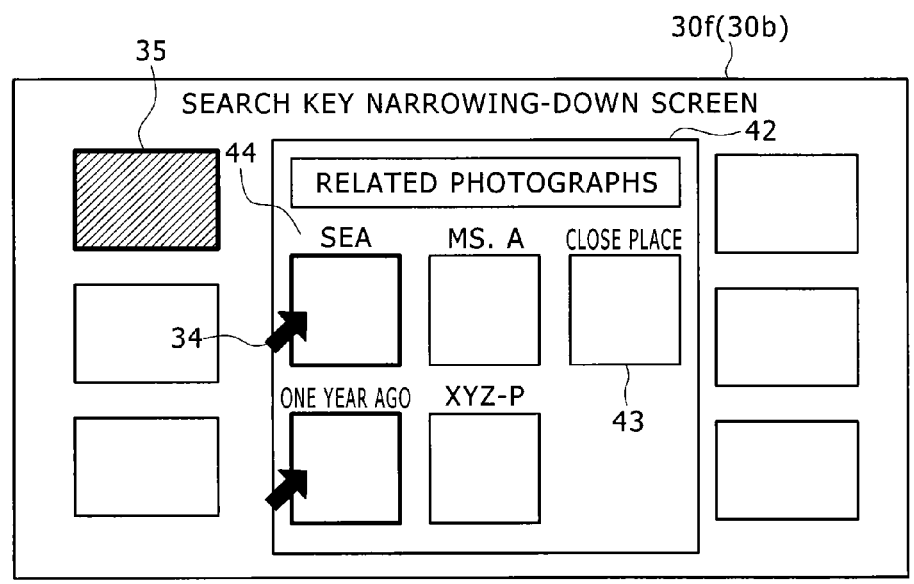
FIG. 9 is a diagram showing an example of a search key narrowing-down screen displayed in the information processing system according to the first aspect of the embodiment of the present disclosure.

FIG. 9 is a diagram showing a search key narrowing-down screen 30f of the information processing system S, which search key narrowing-down screen 30f is displayed on the display screen of the output section 21. The search key narrowing-down screen 30f shown in FIG. 9 is displayed when the user selects one of the thumbnail images 35 in FIG. 5.

A display screen showing the search key narrowing-down screen 30f is formed by superimposing and displaying a related photograph window 42 similar to that of FIG. 6 on the display screen showing the selecting screen 30b as shown in FIG. 5. Specifically, the related photograph window 42 displays a plurality of sets of thumbnail images 43 of image files 10 related to the image file 10 corresponding to the thumbnail image 35 selected in FIG. 5 (thumbnail image 35 hatched in FIG. 9) and search keys 44 used when the thumbnail images 43 are extracted.

The display screen showing the search key narrowing-down screen 30f also displays the pointer 34 indicating the position input by the user. The user moves the pointer 34 within the display screen by the input section 22, and operates the input section 22 with at least a part of the pointer 34 displayed in a state of being superimposed on a thumbnail image 43 desired to be selected. This is repeated sequentially to select a plurality of thumbnail images 43 (thumbnail images 43 indicated by a thick frame in the example shown in FIG. 9). An arbitrary method may be adopted to perform input operation so as to distinguish the operation of selecting a single thumbnail image 37 on the search key display screen 30c shown in FIG. 6 from the operation of selecting a plurality of thumbnail images 43 on the search key narrowing-down screen 30f shown in FIG. 9. As an example, a method is cited in which a special key, button, or the like for selecting the operation of selecting a plurality of thumbnail images 43 is provided on the input section 22, and the key or the like is operated to thereby make a transition to the operation of selecting a plurality of thumbnail images 43. Further, the input section 22 is preferably provided with a key, a button, or the like for selecting which of a union of sets and a product set of search results based on the respective search keys 44 corresponding to the plurality of selected thumbnail images 43 is to be displayed on the search display screen 30d, which is displayed as a result of the operation of selecting the thumbnail images 43 on the search key narrowing-down screen 30f in FIG. 9.

When the user has selected a plurality of thumbnail images 43, a selection input signal indicating the thumbnail images 43 selected by the user and a search result selection signal for selecting which of a union of sets and a product set of search results based on the search keys 44 corresponding to the thumbnail images 43 is to be displayed are output from the input section 22, and input to the information processing device 1.

The display screen showing the search display screen 30d as shown in FIG. 7 is thereafter displayed on the display screen of the output section 21. At this time, the display screen displays, on the basis of the search result selection signal, thumbnail images 39 of image data of image files 10 as a union of sets or a product set of search results obtained by searching the image files 10 stored in the storage section 23 using each of the search keys 44 forming sets with the plurality of thumbnail images 43 selected in FIG. 9.

Figure 10:
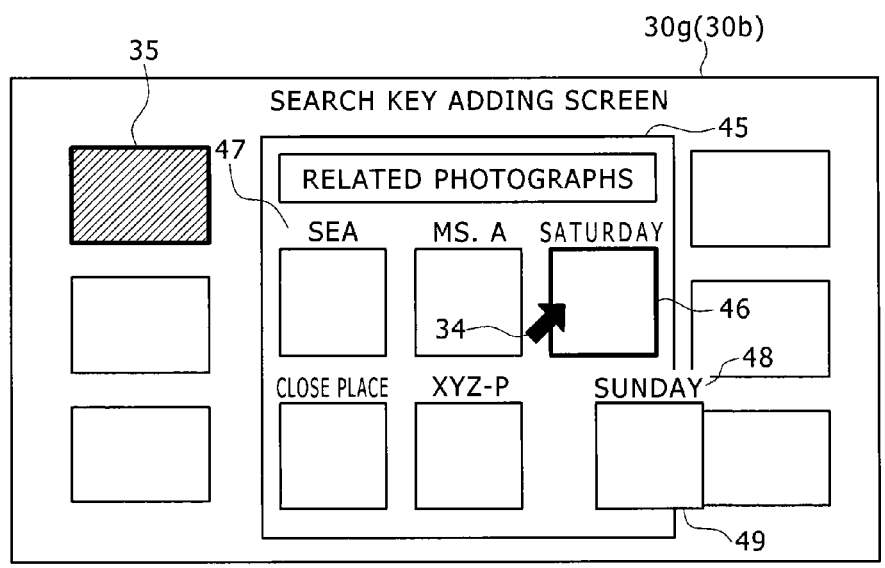
FIG. 10 is a diagram showing an example of a search key adding screen displayed in the information processing system according to the first aspect of the embodiment of the present disclosure.

FIG. 10 is a diagram showing an example of a search key adding screen 30g of the information processing system S, which search key adding screen 30g is displayed on the display screen of the output section 21. The search key adding screen 30g shown in FIG. 10 is displayed when the user selects one of the thumbnail images 35 in FIG. 5.

A display screen showing the search key adding screen 30g is formed by superimposing and displaying a related photograph window 45 similar to that of FIG. 6 on the display screen showing the selecting screen 30b as shown in FIG. 5. Specifically, the related photograph window 45 displays a plurality of sets of thumbnail images 46 of image files 10 related to the image file 10 corresponding to the thumbnail image 35 selected in FIG. 5 (thumbnail image 35 hatched in FIG. 10) and search keys 47 used when the thumbnail images 46 are extracted.

The display screen showing the search key adding screen 30g also displays the pointer 34 indicating the position input by the user. The user moves the pointer 34 within the display screen by the input section 22, and operates the input section 22 with at least a part of the pointer 34 displayed in a state of being superimposed on a thumbnail image 46 desired to be selected. The user thereby selects the thumbnail image 46 (thumbnail image 46 indicated by a thick frame in the example shown in FIG. 10).

When the thumbnail image 46 is selected, the search key 47 corresponding to the selected thumbnail image 46 is identified. A new search key 48 obtained by fine adjustment of tag information is generated for the search key 47. Further, a thumbnail image 49 of an image file 10 as a search result obtained by searching the image files 10 stored in the storage section 23 using the new search key 48 is extracted. The search key 48 and the thumbnail image 49 are displayed as a set. The fine adjustment in this case refers to not changing the tag information region searched on the basis of the specific search key but generating a similar search key by changing a part of the search condition. As an example, in the example of FIG. 10, a "Saturday" search key 47 is selected, and therefore a "Sunday" search key 48, which Sunday is a day following Saturday, is generated without changing the photographing date and time region 10e, which is a tag region searched on the basis of the search key 47. Alternatively, the "Sunday" search key 48, which Sunday is a day following Saturday, may be generated by using the order setting operation in the work of making the search key fuzzy as described above.

An arbitrary method may be adopted to perform input operation so as to distinguish the operation of selecting a single thumbnail image 37 on the search key display screen 30c shown in FIG. 6 from the operation of generating a finely adjusted search key 48 on the search key adding screen 30g shown in FIG. 10. As an example, a method is cited in which a special key, button, or the like for giving an instruction to perform the operation of generating a finely adjusted search key is provided on the input section 22, and the key or the like is operated to thereby make a transition to the operation of generating a finely adjusted search key. The thumbnail image 49 based on the finely adjusted search key 48 can be similarly selected by the pointer 34. In either case where the thumbnail image 46 is selected or the thumbnail image 49 is selected, a selection input signal indicating the thumbnail image 46 or 49 selected by the user is output from the input section 22, and input to the information processing device 1.

Figure 11:
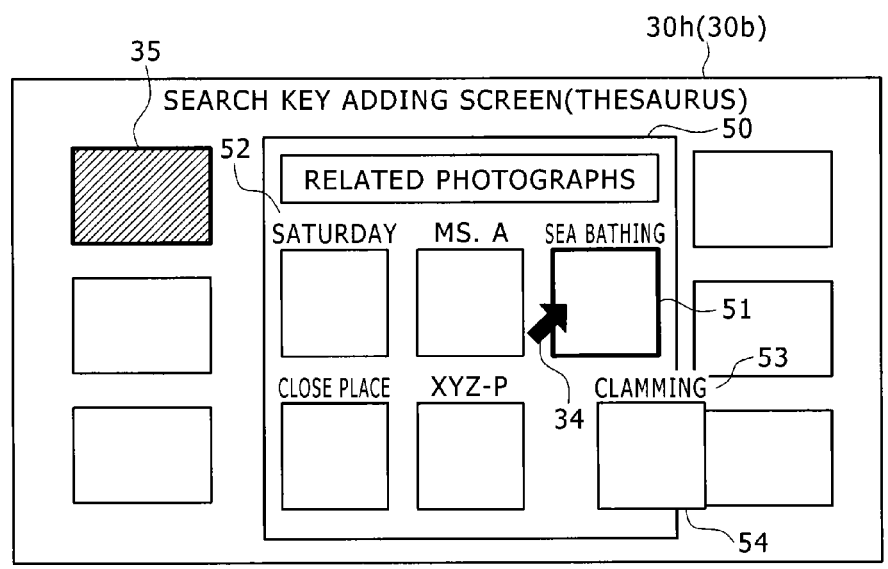
FIG. 11 is a diagram showing another example of the search key adding screen displayed in the information processing system according to the first aspect of the embodiment of the present disclosure.

FIG. 11 is a diagram showing another example of the search key adding screen 30h of the information processing system S, which search key adding screen 30h is displayed on the display screen of the output section 21. The search key adding screen 30h shown in FIG. 11 is displayed when the user selects one of the thumbnail images 35 in FIG. 5.

A display screen showing the search key adding screen 30h is formed by superimposing and displaying a related photograph window 50 similar to that of FIG. 6 on the display screen showing the selecting screen 30b as shown in FIG. 5. Specifically, the related photograph window 50 displays a plurality of sets of thumbnail images 51 of image files 10 related to the image file 10 corresponding to the thumbnail image 35 selected in FIG. 5 (thumbnail image 35 hatched in FIG. 11) and search keys 52 used when the thumbnail images 51 are extracted.

The display screen showing the search key adding screen 30h also displays the pointer 34 indicating the position input by the user. The user moves the pointer 34 within the display screen by the input section 22, and operates the input section 22 with at least a part of the pointer 34 displayed in a state of being superimposed on a thumbnail image 51 desired to be selected. The user thereby selects the thumbnail image 51 (thumbnail image 51 indicated by a thick frame in the example shown in FIG. 11).

When the thumbnail image 51 is selected, the search key 52 corresponding to the selected thumbnail image 51 is identified. A new search key 53 is generated for the search key 52 by using the thesaurus dictionary file 11 (see FIG. 3) within the storage section 23. Further, a thumbnail image 54 of an image file 10 as a search result obtained by searching the image files 10 stored in the storage section 23 using the new search key 53 is extracted. The search key 53 and the thumbnail image 54 are displayed as a set.

An example of generation of the new search key 53 according to the thesaurus dictionary file 11 will be described with reference to FIG. 11 and FIG. 12. In FIG. 11, the thumbnail image 51 corresponding to the "sea bathing" search key 52 is selected by the pointer 34. As for this "sea bathing" search key, the positional tag information described in the GPS information region 10i is inquired of an external server located on the WAN 17, or for example a map server or a server that accumulates information on sightseeing spots, and the name of a landmark having the latitude information, the longitude information, and the altitude information of the positional tag information is obtained. The "sea bathing" search key is generated as a key for searching for an image file 10 including positional tag information indicating a place whose landmark name is that of a bathing beach. Then, the words "sea bathing" themselves are provided to the thesaurus dictionary file 11, and a word as thesaurus information for "sea bathing" is received.

FIG. 12 is a diagram showing an example of the thesaurus dictionary file 11. In the example shown in FIG. 12, "sea bathing" and "clamming" are thesaurus information belonging to a same category of "seas." Hence, the thesaurus dictionary file 11 provides "clamming" as thesaurus information for "sea bathing." Then, an thumbnail image 54 of an image file 10 as a search result obtained by searching the image files 10 stored in the storage section 23 using the new search key "clamming" 53 is extracted. The search key 53 and the thumbnail image 54 are displayed as a set. Incidentally, a thesaurus dictionary located within the external server located on the WAN 17 may be used.

An arbitrary method may be adopted to perform input operation so as to distinguish the operation of selecting a single thumbnail image 37 on the search key display screen 30c shown in FIG. 6 from the operation of generating a search key 53 according to the thesaurus dictionary file 11 on the search key adding screen 30h shown in FIG. 11. As an example, a method is cited in which a special key, button, or the like for giving an instruction to perform the operation of generating a search key according to the thesaurus dictionary file 11 is provided on the input section 22, and the key or the like is operated to thereby make a transition to the operation of generating a search key according to the thesaurus dictionary file 11. The thumbnail image 54 based on the search key 53 according to the thesaurus dictionary file 11 can be similarly selected by the pointer 34. In either case where the thumbnail image 51 is selected or the thumbnail image 54 is selected, a selection input signal indicating the thumbnail image 51 or 54 selected by the user is output from the input section 22, and input to the information processing device 1.

(Flow of Operation of Information Processing System)

A flow of operation of the information processing system S according to the first aspect of the embodiment of the present disclosure will next be described with reference to flowcharts of FIG. 15 and FIG. 16.

Figure 15:
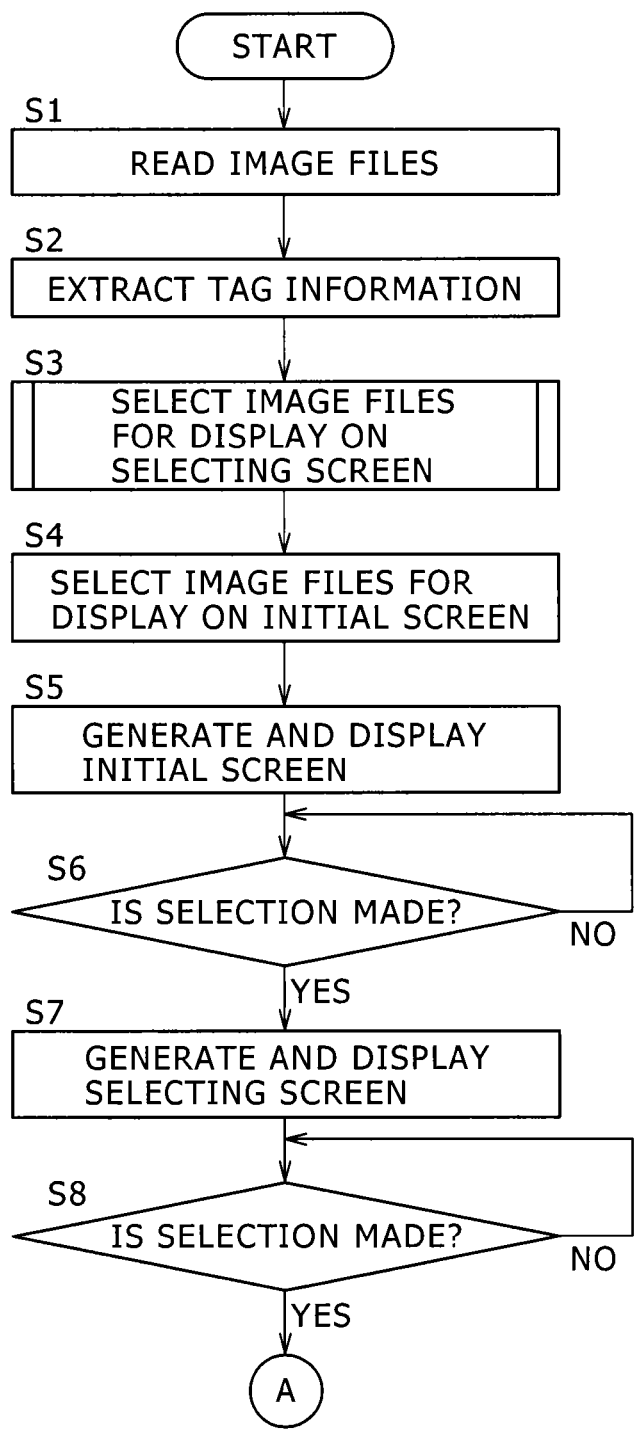
FIG. 15 is a flowchart of assistance in explaining an example of an operation of the information processing system according to the first aspect of the embodiment of the present disclosure.
Figure 16:
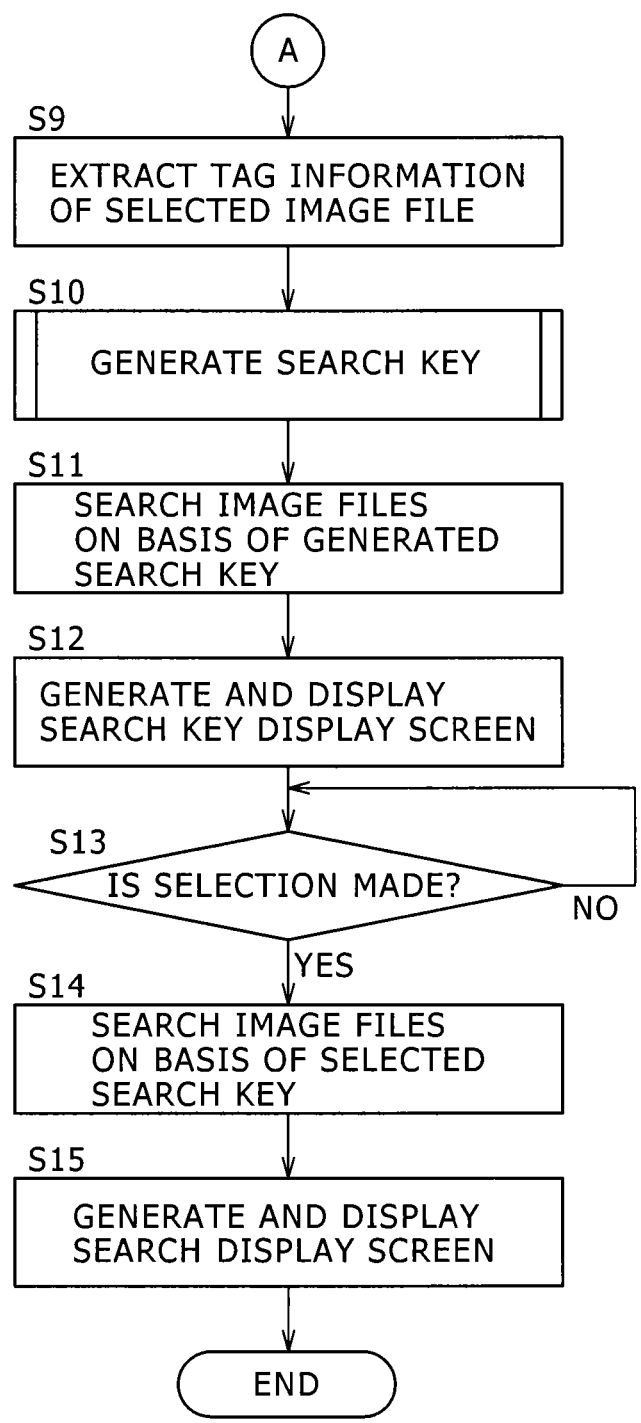
FIG. 16 is a flowchart of assistance in explaining another example of the operation of the information processing system according to the first aspect of the embodiment of the present disclosure.

The operation illustrated in the flowchart of FIG. 15 is started at a point in time that power to the information processing device 1 is turned on and thus the information processing device 1 is started by operating a power button not shown in the figures or the like. First, in step S1, the image file selecting block 25 of the control section 24 of the information processing device 1 reads the image data of the image files 10 stored within the storage section 23. Next, in step S2, the image file selecting block 25 extracts tag information described in each region of the header sections 10a of the image files 10 read from the storage section 23. The extracted tag information is temporarily stored in the storage section 23. In addition, information as a result of inquiring of the thesaurus dictionary file 11 within the storage section 23 or an external server located on the WAN 17 with the tag information described in each region of the header sections 10a as a key may be obtained.

Next, in step S3, the image file selecting block 25 selects image files 10 for display on the selecting screen 30b of FIG. 5. As already described, in the operation of selecting the image files 10 in step S3, the image file selecting block 25 may randomly select image files 10 equal in number to the number of thumbnail images 35 that can be displayed on the selecting screen 30b from the image files 10 stored within the storage section 23, or select image files 10 on the basis of the tag information extracted in step S2 such that display of duplicate thumbnail images 35 of image data that may be searched for on the basis of an identical search key is prevented as much as possible.

Next, in step S4, the image data of image files 10 to be superimposed on the buttons 31 to be displayed on the initial screen 30*a* is selected. Image files 10 as a parent population for the selection are the image files 10 selected in step S3. At this time, as already described, the selection may be made such that display of duplicate image data that may be searched for on the basis of an identical search key is prevented as much as possible. Then, in step S5, the data of the initial screen 30*a* as shown in FIG. 4, which data includes the image data of the image files 10 selected in step S4, is generated, and displayed by the output section 21.

Next, in step S6, the information processing device 1 waits for a selection input signal indicating that one of the buttons 31 to 33 is selected to be output from the input section 22 when the user operates the input section 22 to thereby move the pointer 34 on the initial screen 30*a* and then the user operates the input section 22 with the pointer 34 displayed in a state of being superimposed on at least a part of one of the buttons 31 to 33. When a selection input signal indicating that a button 31 for making a transition to the photograph data viewing mode is selected by the user is output from the input section 22 to the control section 24 (YES in step S6), the program proceeds to step S7.

In step S7, the image file selecting block 25 generates the data of the selecting screen 30*b* as shown in FIG. 5, which selecting screen 30*b* includes the thumbnail images 35 of the image files 10 selected in step S3, and makes the output section 21 display the selecting screen 30*b*. Next, in step S8, the program waits for a selection input signal indicating that one of the thumbnail images 35 is selected to be output from the input section 22 when the user operates the input section 22 to thereby move the pointer 34 on the selecting screen 30*b* and then the user operates the input section 22 with the pointer 34 displayed in a state of being superimposed on at least a part of one of the thumbnail images 35. When a selection input signal indicating that one of the thumbnail images 35 is selected by the user is output from the input section 22 to the control section 24 (YES in step S8), the program proceeds to step S9 in FIG. 16.

In step S9, the information obtaining block 26 obtains the tag information of the image file 10 corresponding to the thumbnail image 35 selected in step S8. As already described, the information obtained by the information obtaining block 26 includes information described in each region of the header section 10*a* of the image file 10. Other information obtained by the information obtaining block 26 includes for example thesaurus information obtained by providing the information described in each region of the header section 10*a* of the image file 10 to the thesaurus dictionary file 11 stored in the storage section 23 as well as information obtained by providing the information described in each region of the header section 10*a* of the image file 10 to the WAN 17.

Next, in step S10, using at least one piece of the tag information obtained by the information obtaining block 26 in step S9, the search key generating block 27 generates at least one search key, or preferably a plurality of search keys, which search key or search keys are abstracted from the obtained tag information. The procedure for generating the abstracted search keys and examples of the generated search keys have already been described, and therefore description thereof will be omitted in the following. Similarly, the search key generating block 27 may finely adjust the generated search keys, and make the generated search keys fuzzy. The work of finely adjusting the generated search keys and the work of making the generated search keys fuzzy have already been described, and therefore description thereof will be omitted in the following.

In step S11, the search key generating block 27 searches for image files 10 stored in the storage section 23 using the search keys generated in step S10. In this case, the search key generating block 27 does not need to search for image files 10 in step S11 on the basis of all of the search keys generated in step S10. It suffices for the search key generating block 27 to make a minimum search using search keys corresponding to the number of sets of thumbnail images 37 and search keys 38 to be displayed on the search key display screen 30*c* shown in FIG. 6 (that is, the search keys 38 to be displayed on the search key display screen 30*c*). Then, in step S12, the search key generating block 27 generates the data of the search key display screen 30*c* as shown in FIG. 6 on the basis of the search keys generated in step S10 and the image files 10 searched for in step S11, and makes the output section 21 display the search key display screen 30*c*. As already described, the sets of the thumbnail images 37 and the search keys 38 displayed on the search key display screen 30*c* do not necessarily correspond to all of the search keys and the image files 10 generated and searched for in step S10 and step S11, respectively.

In step S13, the program waits for a selection input signal indicating that one of the thumbnail images 37 is selected to be output from the input section 22 when the user operates the input section 22 to thereby move the pointer 34 on the search key display screen 30*c* and then the user operates the input section 22 with the pointer 34 displayed in a state of being superimposed on at least a part of one of the thumbnail images 37. When a selection input signal indicating that one of the thumbnail images 37 is selected by the user is output from the input section 22 to the control section 24 (YES in step S13), the program proceeds to step S14. As already described, a plurality of thumbnail images 43 may be selected in step S13 (see FIG. 9). In addition, when a plurality of thumbnail images 43 are selected, a selection is also made as to which of an union of sets and a product set of search keys 44 corresponding to the plurality of thumbnail images 43 as search results is to be displayed. In this case, the input section 22 outputs a selection input signal indicating that the plurality of thumbnail images 43 are selected and a search result selection signal for selecting which of the union of sets and the product set of the search results based on the search keys 44 corresponding to the thumbnail images 43 is to be displayed.

In step S14, the image file searching block 28 searches for image files 10 stored in the storage section 23 using the search key 38 selected in step S13. In addition, when the plurality of search keys 44 displayed on the output section 21 are selected by the input section 22, the image file searching block 28 receives a plurality of search key selection signals output from the input section 22 and the search result selection signal output from the input section 22 for selecting which of the union of sets and the product set of the search results based on the search keys 44 corresponding to the thumbnail images 43 is to be displayed. The image file searching block 28 searches for image files 10 as the union of sets or the product set of the search results based on the plurality of search keys 44.

Then, in step S15, the image file searching block 28 generates the data of the search display screen 30*d* as shown in FIG. 7 or the time line screen 30*e* as shown in FIG. 8, which screen includes the thumbnail image 39 of at least one image file 10 of the image files 10 searched for in step S14, and makes the output section 21 display the search display screen 30*d* or the time line screen 30*e*. As already described, the number of thumbnail images 39 that the image file searching block 28 makes the output section 21 display is determined depending on the search result, and it is not necessary to display the thumbnail images 39 of the image files 10 as all of the search result.

(Effect of First Aspect of Embodiment of Present Disclosure)

As described above in detail, in the information processing system S according to the first aspect of the embodiment of the present disclosure, the thumbnail image 35 of an image file 10 stored within the storage section 23 is displayed on the display screen 30b, and the tag information of the image file 10 is obtained. When the thumbnail image 35 is selected, a search key 38 is generated on the basis of the tag information of the image file 10 corresponding to the selected thumbnail image 35. When the search key 38 is selected, an image file 10 is searched for on the basis of the selected search key 38, and the thumbnail image 39 of the image file 10 as the search result is displayed. Alternatively, when the thumbnail image 35 is selected, the tag information of the image file 10 corresponding to the selected thumbnail image 35 is obtained. A search key 38 is generated on the basis of the tag information. When the search key 38 is selected, an image file 10 is searched for on the basis of the selected search key 38, and the thumbnail image 39 of the image file 10 as the search result is displayed.

That is, when the user directs attention to a displayed thumbnail image 35, the user selects the thumbnail image 35. Thereby thumbnail images 37 and search keys 38 related to the selected thumbnail image 35 are displayed. When one of the thumbnail images 37 is selected, image files 10 within the storage section 23 are searched for on the basis of the corresponding search key 38, and the thumbnail images 39 of the image files 10 as the search result can be obtained.

Hence, according to the first aspect of the embodiment of the present disclosure, with respect to the thumbnail image 35 of an image file 10, image files 10 related to the image file 10 can be searched for easily without the user specifying, in advance, tag information desired for the search and display as in the conventional techniques described above. This improves the convenience of the user.

(Second Aspect)

Figure 17:
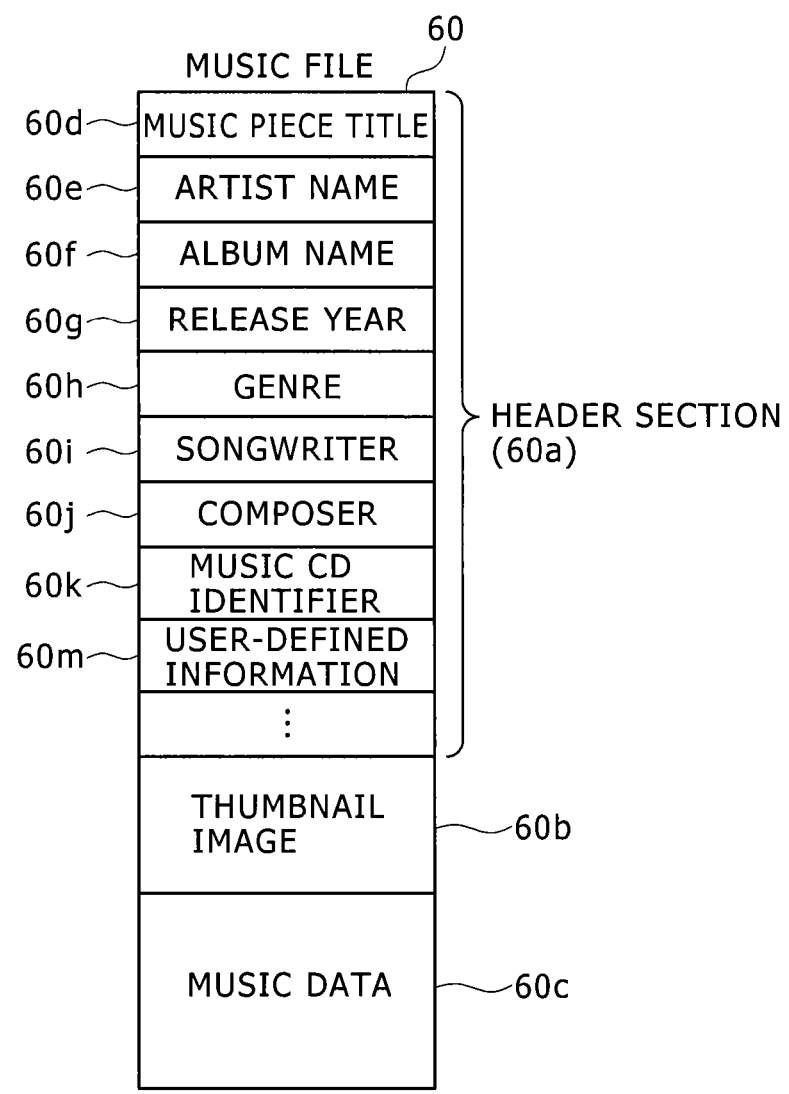
FIG. 17 is a diagram showing an example of a data structure of a music file used in an information processing system according to a second aspect of the embodiment of the present disclosure.

An information processing system S according to a second aspect of the embodiment of the present disclosure will next be described with reference to FIG. 17. FIG. 17 is a diagram showing the data structure of a music file 60 used in the information processing system S according to the second aspect of the embodiment of the present disclosure. Incidentally, the information processing system S according to the second aspect of the embodiment of the present disclosure has a similar configuration to that of the foregoing first aspect of the embodiment of the present disclosure except that the music file 60 shown in FIG. 17 is applied to the information processing system S according to the second aspect of the embodiment of the present disclosure in place of the image file 10 according to the first aspect of the embodiment of the present disclosure. Thus, the same constituent elements are identified by the same reference numerals, and description thereof will be simplified.

The music file 60 according to the second aspect of the embodiment of the present disclosure has an mp3 (MPEG Audio Layer-3) file format. The music file 60 has a header section 60a storing tag information in accordance with a format defined by an ID3 tag, a thumbnail image region 60b storing thumbnail image data, and a music data region 60c storing music data. At a time of creation of the music file 60, a PC (Personal Computer) not shown in the figures or the like inquires of a CDDB (Compact Disc DataBase) such as Gracenote or the like, and the PC or the like stores tag information returned from the CDDB in predetermined regions of the header section 60a, whereby the tag information stored in the header section 60a of the music file 60 according to the second aspect of the embodiment of the present disclosure is described. Hence, suppose that the tag information stored in the header section 60a is already described in the predetermined regions of the header section 60a of the music file 60 at a time of capturing of the music file 60 into an information processing device 1.

The header section 60a of the music file 60 includes: a music piece title region 60d in which the title of the music piece of the music file 60 is described; an artist name region 60e in which the name of an artist that produced the music file 60 is described; an album name region 60f in which the name of an album including the music file 60 is described; a release year region 60g in which the year of the release of the music file 60 is described; a genre region 60h in which a genre to which the music file 60 belongs is described; a songwriter region 60i in which the name of a songwriter of the music file 60 is described; a composer region 60j in which the name of a composer of the music file 60 is described; a music CD identifier region 60k in which an identifier uniquely given to a music CD is described when the music file 60 is obtained from the music CD; and a user-defined region 60m for the user of the information processing device 1 to describe various kinds of information arbitrarily. The header section 60a of the music file 60 may further include other regions.

When the music file 60 having the data structure shown in FIG. 17 is applied to the information processing system S according to the second aspect of the embodiment of the present disclosure, for example a search key "music pieces for a cherry-blossom season" can be created by using, that is, abstracting a part of the music piece title tag information described in the music piece title region 60d, and a result of searching for music files 60 on the basis of the search key can be displayed. In addition, a search key related to the name of another artist who often plays together with an artist identified by the artist name tag information described in the artist name region 60e can be created by using a thesaurus dictionary file 11 or an external server on a WAN 17, and a result of searching for music files 60 on the basis of the search key can be displayed.

In this case, in order to allow the user to select a music file 60 and a search key, the user needs to be able to check what music files 60 and search keys are stored within the information processing device 1 and generated by the information processing device 1. Methods for allowing the user to check the music files 60 and the search keys include, for the music files 60, a method of displaying thumbnail image data as indexes of the music files 60, which thumbnail image data is stored in the thumbnail image regions 60b, using an HDMI output device 15 and, for the search keys, a method of displaying character strings representing the search keys using the HDMI output device 15. Alternatively, for the music files 60, music piece title data as indexes of the music files 60, which music piece title data is stored in the music piece title regions 60d, may be displayed in the form of a list using the HDMI output device 15.

Hence, the present aspect can produce similar effects to those of the foregoing first aspect of the embodiment of the present disclosure.

(Third Aspect)

Figure 18:
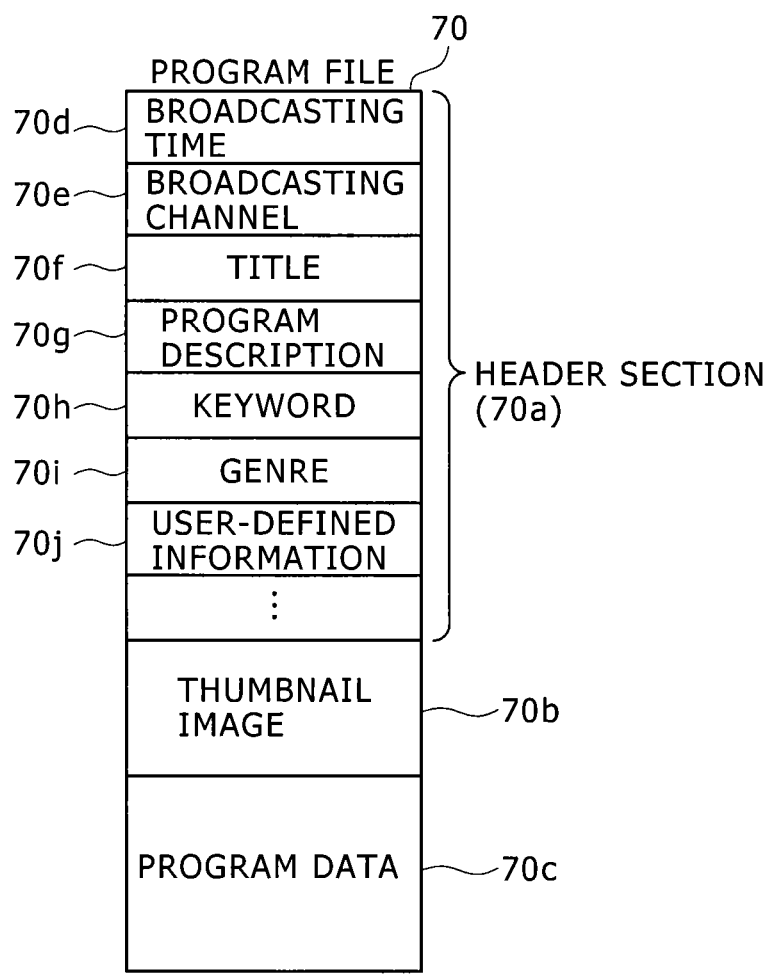
FIG. 18 is a diagram showing an example of a data structure of a program file used in an information processing system according to a third aspect of the embodiment of the present disclosure.

An information processing system S according to a third aspect of the embodiment of the present disclosure will next be described with reference to FIG. 18. FIG. 18 is a diagram showing the data structure of a program file 70 used in the information processing system S according to the third aspect of the embodiment of the present disclosure. Incidentally, the information processing system S according to the third aspect of the embodiment of the present disclosure has a similar configuration to that of the foregoing first aspect of the embodiment of the present disclosure except that the program file 70 shown in FIG. 18 is applied to the information processing system S according to the third aspect of the embodiment of the present disclosure in place of the image file 10 according to the first aspect of the embodiment of the present disclosure. Thus, the same constituent elements are identified by the same reference numerals, and description thereof will be simplified.

The program file 70 according to the third aspect of the embodiment of the present disclosure has an MPEG (Moving Picture Experts Group)-2 file format. The program file 70 has a header section 70*a* storing tag information, a thumbnail image region 70*b* storing thumbnail image data, and a program data region 70*c* storing program data. A recoding device not shown in the figures obtains EPG (Electronic Program Guide) data transmitted from a broadcasting station in advance, and the recording device stores tag information obtained from program information data within the EPG data in predetermined regions of the header section 70*a* at a time of recording of the program file 70, whereby the tag information stored in the header section 70*a* of the program file 70 according to the third aspect of the embodiment of the present disclosure is described. In ISDB-T (Integrated Services Digital Broadcasting-Terrestrial), which is a standard used in terrestrial digital television broadcasting in Japan, this program information data is described in the EIT (Event Information Table) of an MPEG-2 TS (Transport Stream). Hence, suppose that the tag information stored in the header section 70*a* is already described in the predetermined regions of the header section 70*a* of the program file 70 at a time of capturing of the program file 70 into an information processing device 1.

The header section 70*a* of the program file 70 includes: a broadcasting time region 70*d* in which the broadcasting time of the program file 70 is described; a broadcasting channel region 70*e* in which the broadcasting channel of the program file 70 is described; a title region 70*f* in which the program title of the program file 70 is described; a program description region 70*g* in which the program description of the program file 70 is described; a keyword region 70*h* in which a keyword related to the program contents of the program file 70 is described; a genre region 70*i* in which a genre to which the program contents of the program file 70 belong is described; and a user-defined region 70*j* for the user of the information processing device 1 to describe various kinds of information arbitrarily. The header section 70*a* of the program file 70 may further include other regions.

When the program file 70 having the data structure shown in FIG. 18 is applied to the information processing system S according to the third aspect of the embodiment of the present disclosure, for example a search key "midnight program" can be created by using, that is, abstracting a part of the broadcasting time tag information described in the broadcasting time region 70*d*, and a result of searching for program files 70 on the basis of the search key can be displayed. In addition, a search key related to another performer who often plays together with a performer identified by performer name tag information described in the program description region 70*g* can be created by using a thesaurus dictionary file 11 or an external server on a WAN 17, and a result of searching for program files 70 on the basis of the search key can be displayed.

In this case, in order to allow the user to select a program file 70 and a search key, the user needs to be able to check what program files 70 and search keys are stored within the information processing device 1 and generated by the information processing device 1. Methods for allowing the user to check the program files 70 and the search keys include, for the program files 70, a method of displaying thumbnail image data as indexes of the program files 70, which thumbnail image data is stored in the thumbnail image regions 70*b*, using an HDMI output device 15 and, for the search keys, a method of displaying character strings representing the search keys using the HDMI output device 15. Alternatively, for the program files 70, title data as indexes of the program files 70, which title data is stored in the title regions 70*f*, may be displayed in the form of a list using the HDMI output device 15.

Hence, the present aspect can produce similar effects to those of the foregoing first and second aspects of the embodiment of the present disclosure.

(Fourth Aspect)

An information processing system S according to a fourth aspect of the embodiment of the present disclosure will next be described with reference to FIGS. 19 to 26. Incidentally, the information processing system S according to the fourth aspect of the embodiment of the present disclosure has a similar configuration to that of the foregoing first aspect of the embodiment of the present disclosure except that the information processing system S according to the fourth aspect of the embodiment of the present disclosure has different display screens displayed on an output section 21 and a different search procedure. Thus, the same constituent elements are identified by the same reference numerals, and description thereof will be simplified.

Figure 19:
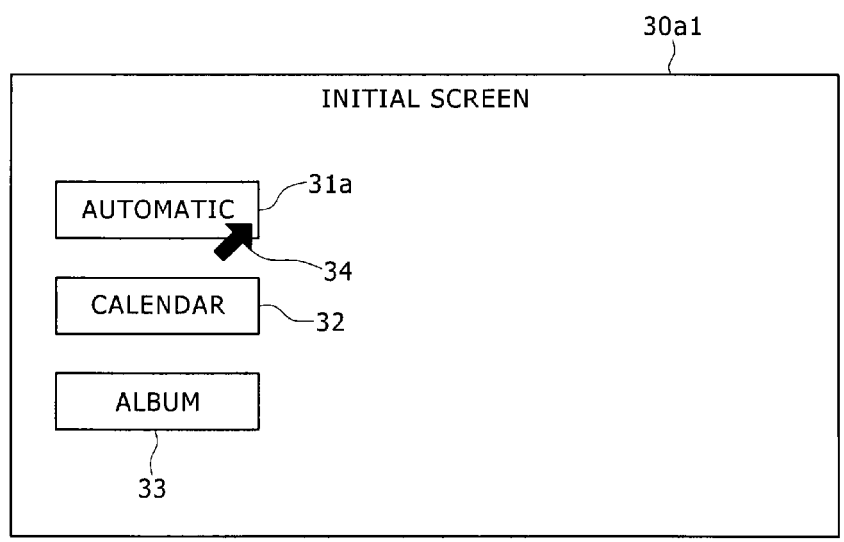
FIG. 19 is a diagram showing an example of an initial screen displayed in an information processing system according to a fourth aspect of the embodiment of the present disclosure.

FIG. 19 is a diagram showing an initial screen 30*a*1 of the information processing system S, which initial screen 30*a*1 is displayed on a display screen of the output section 21. The display screen showing the initial screen 30*a*1 displays a button 31*a* for making a transition to a search display screen shown in FIG. 20. As in the foregoing first aspect of the embodiment of the present disclosure, the display screen showing the initial screen 30*a*1 displays a button 32 for making a transition to a calendar mode and a button 33 for making a transition to an album mode.

Specifically, in the fourth aspect of the embodiment of the present disclosure, the initial screen 30*a*1 displays the button 31*a* for making a transition directly to a search display screen rather than making transitions in order of an initial screen, a selecting screen, a search key display screen, and a search display screen as in the first aspect of the embodiment of the present disclosure. The user moves a pointer 34 within the initial screen 30*a*1 by an input section 22 such as a remote control, a mouse, and the like, and operates the input section 22 with at least a part of the pointer 34 displayed in a state of being superimposed on the button 31*a* desired to be selected. A selection input signal indicating whether the button 31*a* is selected by the user is thereby output from the input section 22, and input to an information processing device 1.

Figure 20:
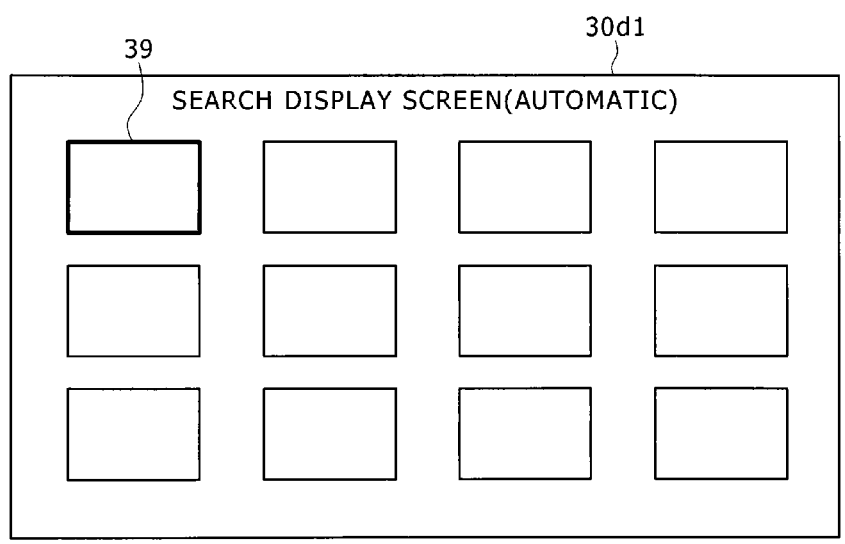
FIG. 20 is a diagram showing an example of a search display screen displayed in the information processing system according to the fourth aspect of the embodiment of the present disclosure.

FIG. 20 is a diagram showing a search display screen 30*d*1 of the information processing system S, which search display screen 30*d*1 is displayed on a display screen of the output section 21. The search display screen 30*d*1 shown in FIG. 20 is displayed when the user selects the button 31*a* in FIG. 19.

The display screen showing the search display screen 30*d*1 displays thumbnail images 39 of image data of image files 10 as a search result obtained by searching image files 10 stored in a storage section 23 using predetermined search keys with the selection of the button 31*a* by the user as a trigger. The predetermined search keys in this case are a plurality of search keys selected by a search key generating block 27 from a plurality of search key candidates determined in advance according to a certain condition without depending on selections by the user. Thus, the search key generating block 27 selects a plurality of search keys from the plurality of search key candidates determined in advance, and a result of a search based on the predetermined search keys is displayed on the search display screen 30d1. The user can therefore view image files 10 as the search result from various viewpoints from among the image files 10 stored within the storage section 23, and can search easily for image files 10 related to one of the image files 10 as the search result, as will be described later.

Alternatively, as in the first aspect of the embodiment of the present disclosure, tag information described in each region of the header sections 10a of the image files 10 stored in the storage section 23 may be obtained, the frequency of the tag information may be calculated, and a low weight may be set to image files 10 having tag information of a high frequency. Then, image files 10 to be displayed are selected in such a manner as to equalize weights as much as possible, whereby image files 10 having specific tag information can be prevented from being displayed in a concentrated manner.

Alternatively, for each thumbnail image 39, the number of times of selection of the thumbnail image 39 by the user on the search display screen 30d1 is stored in the storage section 23, and the number of times of selection is used as tag information of the image file 10. Not only the number of times of selection on the search display screen 30d1 but also the number of times of selection on a search narrowing-down display screen 30i to be described later may be stored as the number of times of selection. In this case, when a thumbnail image 80 is selected on the search narrowing-down display screen 30i, the number of times of selection of a thumbnail image 39 on the search display screen 30d1 which thumbnail image 39 is selected when the thumbnail image 80 is displayed may also be stored. Then, it suffices to determine the thumbnail images 39 and 80 to be displayed on the search display screen 30d1 and the search narrowing-down display screen 30i on the basis of the numbers of times of selection thus stored as tag information of the image files 10 and on the basis of an action history indicating the numbers of times of selection of thumbnail images 39 and 80 that tend to be selected by the user. For example, when the user has a strong tendency to select thumbnail images 39 and 80 selected large numbers of times, thumbnail images 39 and 80 selected large numbers of times are preferentially displayed on the search display screen 30d1 and the search narrowing-down display screen 30i. When the user has a strong tendency to select thumbnail images 39 and 80 selected small numbers of times, thumbnail images 39 and 80 selected small numbers of times are preferentially displayed on the search display screen 30d1 and the search narrowing-down display screen 30i. The search display screen 30d1 and the search narrowing-down display screen 30i can be thus displayed according to the action history of the user.

Figure 21:
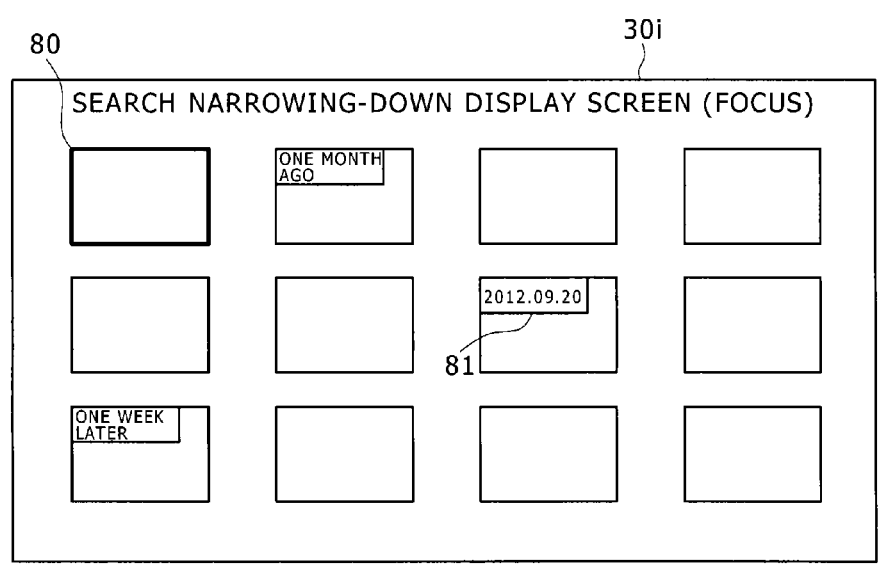
FIG. 21 is a diagram showing an example of a search narrowing-down display screen displayed in the information processing system according to the fourth aspect of the embodiment of the present disclosure.

FIG. 21 is a diagram showing the search narrowing-down display screen 30i of the information processing system S, which search narrowing-down display screen 30i is displayed on a display screen of the output section 21. The search narrowing-down display screen 30i shown in FIG. 21 is displayed when the user selects one of the thumbnail images 39 in FIG. 20.

The display screen showing the search narrowing-down display screen 30i displays the thumbnail images 80 of image data of image files 10 as a search result obtained by searching the image files 10 stored in the storage section 23 using search keys generated by the search key generating block 27 with reference to the tag information of the image file 10 corresponding to the thumbnail image 39 selected in FIG. 20. In addition, some thumbnail images 80 displayed on the search narrowing-down display screen 30i have labels 81 displayed in the vicinity of these thumbnail images 80, the labels 81 indicating contents relating to the search keys used for retrieving these thumbnail images 80.

The search keys generated by the search key generating block 27 to display the search narrowing-down display screen 30i shown in FIG. 21 are determined in advance. Specifically there are four kinds of search keys:

(1) A search key for searching image files 10 with reference to the photographing date and time tag information of the image file 10 corresponding to the thumbnail image 39 selected in FIG. 20, the photographing date and time tag information being one of the tag information and stored in the photographing date and time region 10e of the image file 10, wherein the search key retrieves image files 10 each having photographing date and time information located before and after the reference date and time tag information on the time axis, while providing higher priority in retrieval to image files 10 having photographing date and time tag information closer to the photographing date and time tag information of the image file 10 corresponding to the selected thumbnail image 39.

(2) A search key for searching image files 10 with reference to the photographing date and time tag information of the image file 10 corresponding to the thumbnail image 39 selected in FIG. 20, the photographing date and time tag information being one of the tag information and stored in the photographing date and time region 10e of the image file 10, wherein the search key retrieves image files 10 each having photographing date and time tag information including time information located within a time-based range centering on the time of the reference photographing date and time information, and including date information located within a predetermined date-based period (several weeks) around the reference photographing date and time information.

(3) A search key for searching image files 10 with reference to the photographing date and time tag information and the model name tag information of the image file 10 corresponding to the thumbnail image 39 selected in FIG. 20, the photographing date and time tag information being one of the tag information and stored in the photographing date and time region 10e of the image file 10, the model name tag information being one of the tag information and stored in the model name region 10g of the image file 10, wherein the search key retrieves image files 10 each having photographing date and time tag information including time information located within a time-based range centering on the time of the reference photographing date and time information, and having model name tag information different from the reference model name tag information.

(4) A search key for searching image files 10 with reference to the photographing date and time tag information of the image file 10 corresponding to the thumbnail image 39 selected in FIG. 20, the photographing date and time tag information being one of the tag information and stored in the photographing date and time region 10e of the image file 10, wherein the search key retrieves image files 10 each having photographing date and time tag information including time/date information located within a time/date-based range centering on the time/date of the reference photographing date and time information, and including year information located within a predetermined year-based period (several years) around the reference photographing date and time information.

Detailed Description Will be Made in the Following with References to FIGS. 22 to 24.

Figure 22:
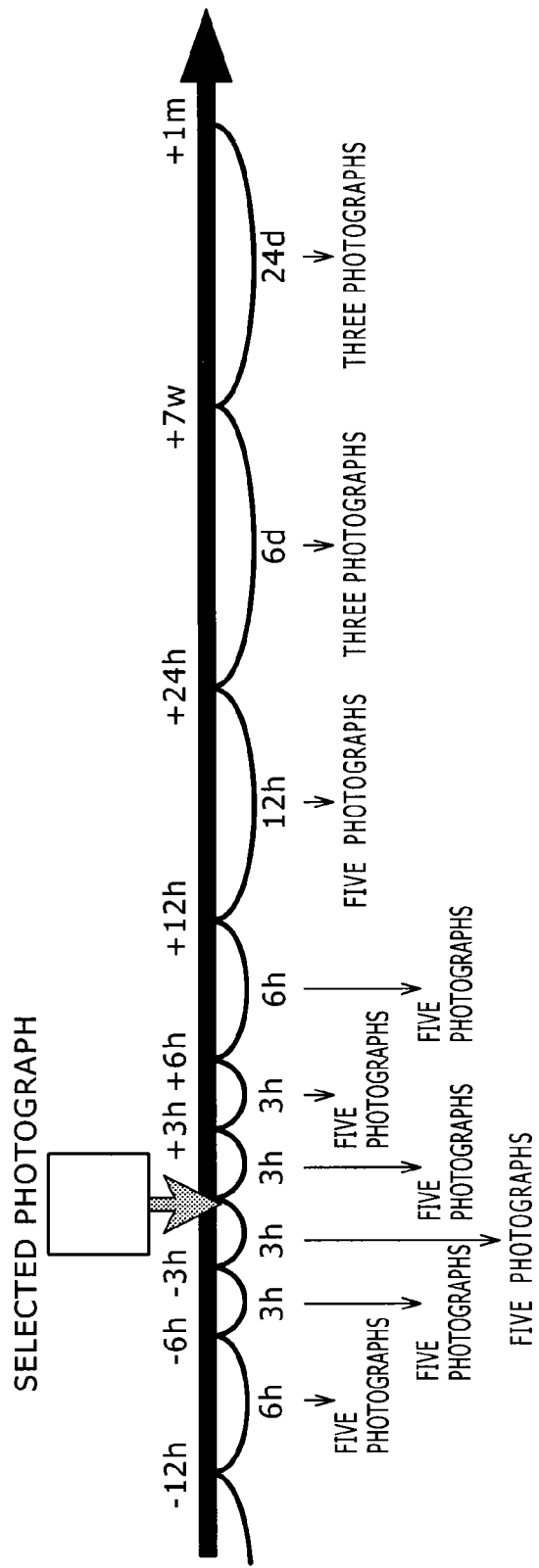
FIG. 22 is a diagram showing an example of divisions of a search range in the information processing system according to the fourth aspect of the embodiment of the present disclosure.

FIG. 22 is a diagram of assistance in explaining specific details of the above-described search key (1). First, the photographing date and time tag information of the image file 10 corresponding to the thumbnail image 39 selected in FIG. 20 is used as a reference, and a predetermined period centering on this photographing date and time information is set. In the example shown in FIG. 22, a temporal range of one month is set. Next, the temporal range of one month is divided into small ranges. At this time, the temporal ranges of the individual small ranges are shortened with decreasing distance from the photographing date and time tag information of the image file 10 corresponding to the selected thumbnail image 39. Then, image files 10 having photographing date and time tag information falling within the small ranges are searched for and extracted. At this time, the number of image files 10 extracted from a small range close to the photographing date and time tag information of the image file 10 corresponding to the selected thumbnail image 39 is made larger than the number of image files 10 extracted from a small range distant from the photographing date and time tag information of the image file 10 corresponding to the selected thumbnail image 39. The image files 10 having photographing date and time tag information close to the photographing date and time tag information of the image file 10 corresponding to the selected thumbnail image 39 are thus extracted preferentially. Incidentally, without being limited to the example shown in FIG. 22, a configuration to adopt either of the following is possible: the temporal ranges of the individual small ranges being shortened with decreasing distance from the photographing date and time tag information of the image file 10 corresponding to the selected thumbnail image 39; or the number of image files 10 extracted from a small range close to the photographing date and time tag information of the image file 10 corresponding to the selected thumbnail image 39 being larger than the number of image files 10 extracted from a small range distant from the photographing date and time tag information of the image file corresponding to the selected thumbnail image 39.

Figure 23:
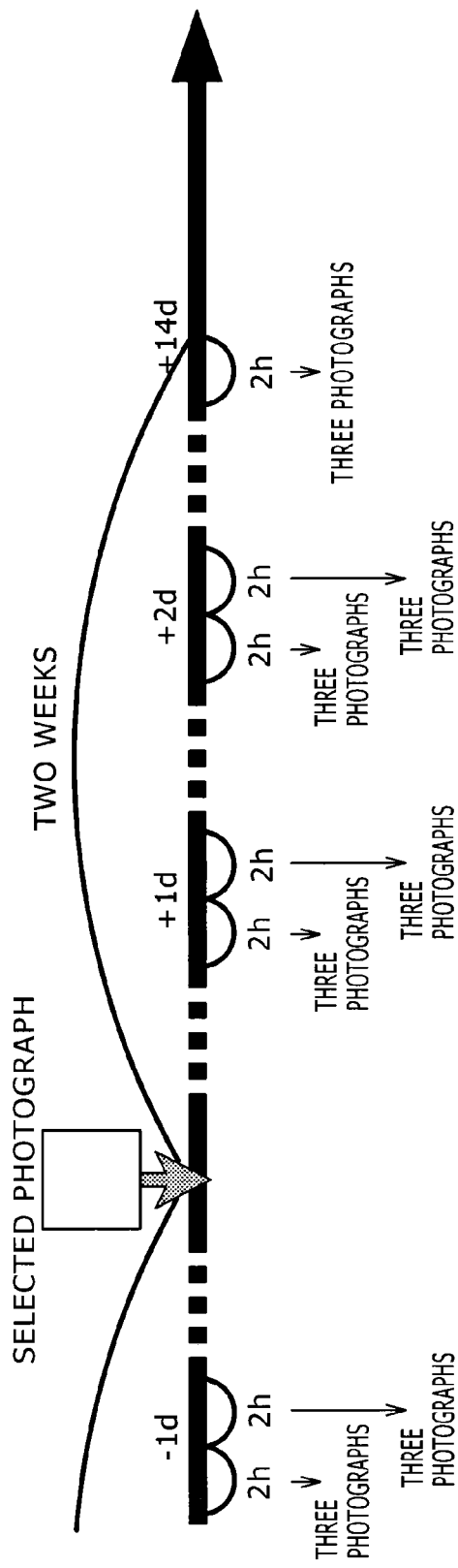
FIG. 23 is a diagram showing another example of divisions of a search range in the information processing system according to the fourth aspect of the embodiment of the present disclosure.

FIG. 23 is a diagram of assistance in explaining specific details of the above-described search key (2). First, the photographing date and time tag information of the image file 10 corresponding to the thumbnail image 39 selected in FIG. 20 is referred to, and predetermined periods, or temporal ranges of 14 days (2 weeks) in the example shown in FIG. 23, are set so as to be centered about the photographing date and time tag information. Next, a reference point is set at intervals of one day (that is, reference points obtained by incrementing and decrementing only the part of "day" of the photographing date and time tag information of the image file 10 corresponding to the selected thumbnail image 39 by one day are set) in the temporal range of 14 days, and small ranges are set so as to extend over two hours before and after the reference points. Then, image files 10 having photographing date and time tag information falling within the small ranges are searched for and extracted. The image files 10 obtained by imaging in the same time period as the time period in which the image file 10 corresponding to the selected thumbnail image 39 was obtained by imaging are thus extracted.

Figure 24:
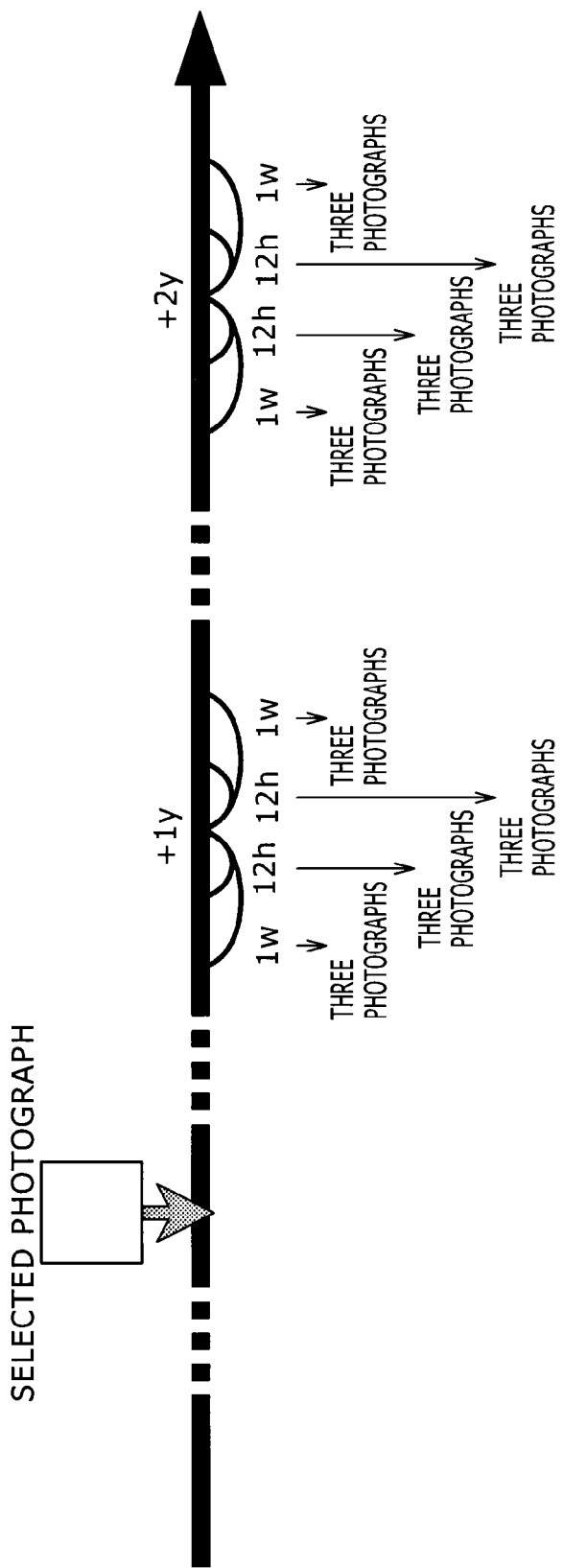
FIG. 24 is a diagram showing yet another example of divisions of a search range in the information processing system according to the fourth aspect of the embodiment of the present disclosure.

FIG. 24 is a diagram of assistance in explaining specific details of the above-described search key (4). First, the photographing date and time tag information of the image file 10 corresponding to the thumbnail image 39 selected in FIG. 20 is referred to, and predetermined periods, or temporal ranges of five years in the example shown in FIG. 24, are set so as to be centered about the photographing date and time tag information. Next, a reference point is set at intervals of one year (that is, reference points obtained by incrementing and decrementing only the part of "year" of the photographing date and time tag information of the image file 10 corresponding to the selected thumbnail image 39 by one year are set) in the temporal range of five years, and small ranges are set so as to extend over 12 hours and one week before and after the reference points. Then, image files 10 having photographing date and time tag information falling within the small ranges are searched for and extracted. The image files 10 obtained by imaging on the same month and day as the month and day on which the image file 10 corresponding to the selected thumbnail image 39 was obtained by imaging are thus extracted.

Thus, the search keys as shown in the above (1) to (4) are set for the photographing date and time tag information of the image file 10 corresponding to the selected thumbnail image 39, that is, not only image files 10 having photographing date and time tag information coinciding with the "month and day" of the photographing date and time tag information of the image file 10 corresponding to the thumbnail image 39 but also image files 10 having photographing date and time tag information preceding and following the "month and day" of the photographing date and time tag information of the image file 10 corresponding to the thumbnail image 39 are searched for. Thereby image files 10 assumed to be desired to be viewed by the user can be displayed on the search narrowing-down display screen 30i. This action will be described with reference to FIG. 25.

Figure 25:
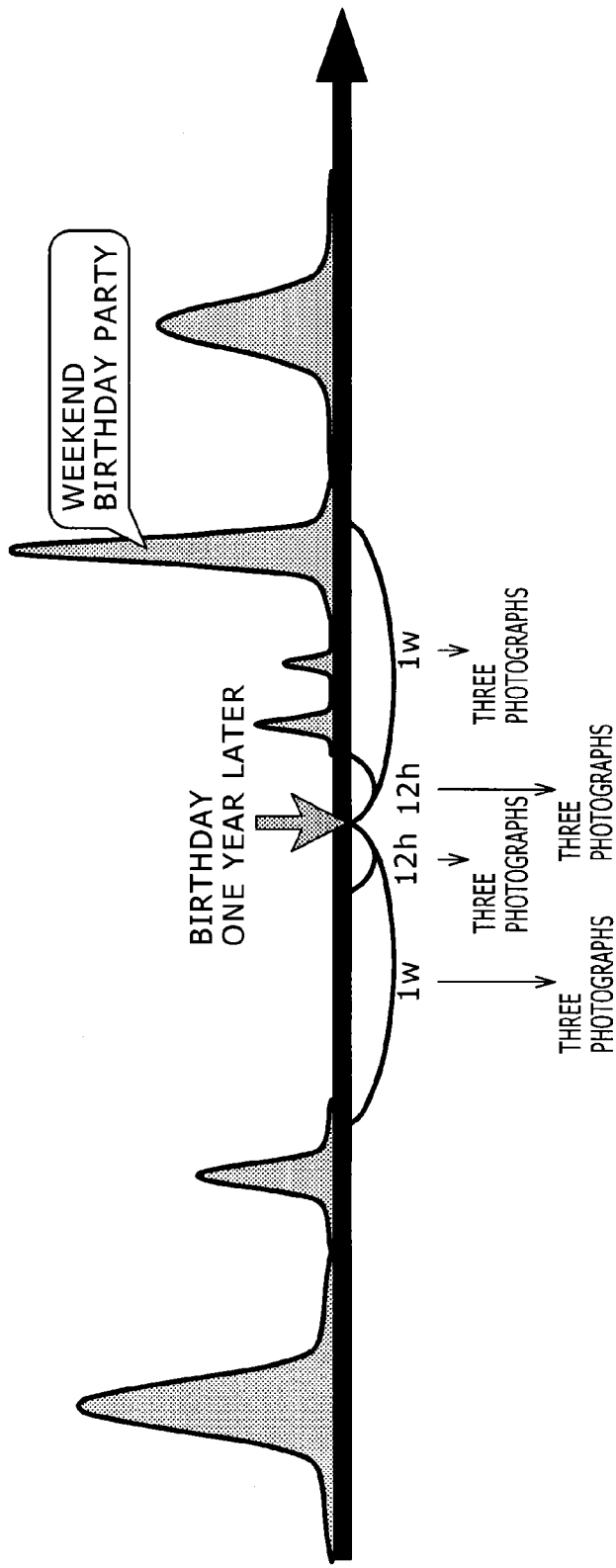
FIG. 25 is a diagram showing an example of frequency of data searched for in the information processing system according to the fourth aspect of the embodiment of the present disclosure.

As shown in FIG. 25, when the user selects a thumbnail image 39 related to the birthday of a particular subject on the search display screen 30d1 of FIG. 20, the search narrowing-down display screen 30i of FIG. 21 displays thumbnail images 80 as a result of a search using the above-described search keys (1) to (4). At this time, when the search key (4) is used, reference points obtained by incrementing and decrementing only the part of "year" of the photographing date and time tag information corresponding to the birthday of the photographic subject by one year are set. In the example shown in FIG. 25, photographing date and time tag information of one year later (birthday one year later) is set as a reference point. Then, image files 10 having photographing date and time tag information falling within small ranges set so as to extend over 12 hours and one week before and after the reference point are searched for and extracted. In this case, even when the photographing date and time tag information corresponding to the thumbnail image 39 is the date and time tag information of a holiday, the birthday one year later is not necessarily a holiday. In this case, there is considered to be a small possibility of the user taking images of image files 10 on the birthday one year later. Accordingly, small ranges are set as described above, whereby image files 10 of a birthday party held on a weekend, for example, which weekend falls within one of the small ranges, can be searched for on the basis of the search key (4), and displayed on the search narrowing-down display screen 30i.

Incidentally, when the user selects one of the thumbnail images 80 on the search narrowing-down display screen 30i shown in FIG. 21, a search narrowing-down display screen is generated again and displayed, the search narrowing-down display screen displaying the thumbnail images of image data of image files 10 as a search result obtained by searching the image files 10 stored in the storage section 23 using search keys generated by the search key generating block 27 from the tag information of the image file 10 corresponding to the selected thumbnail image 80.

Figure 26:
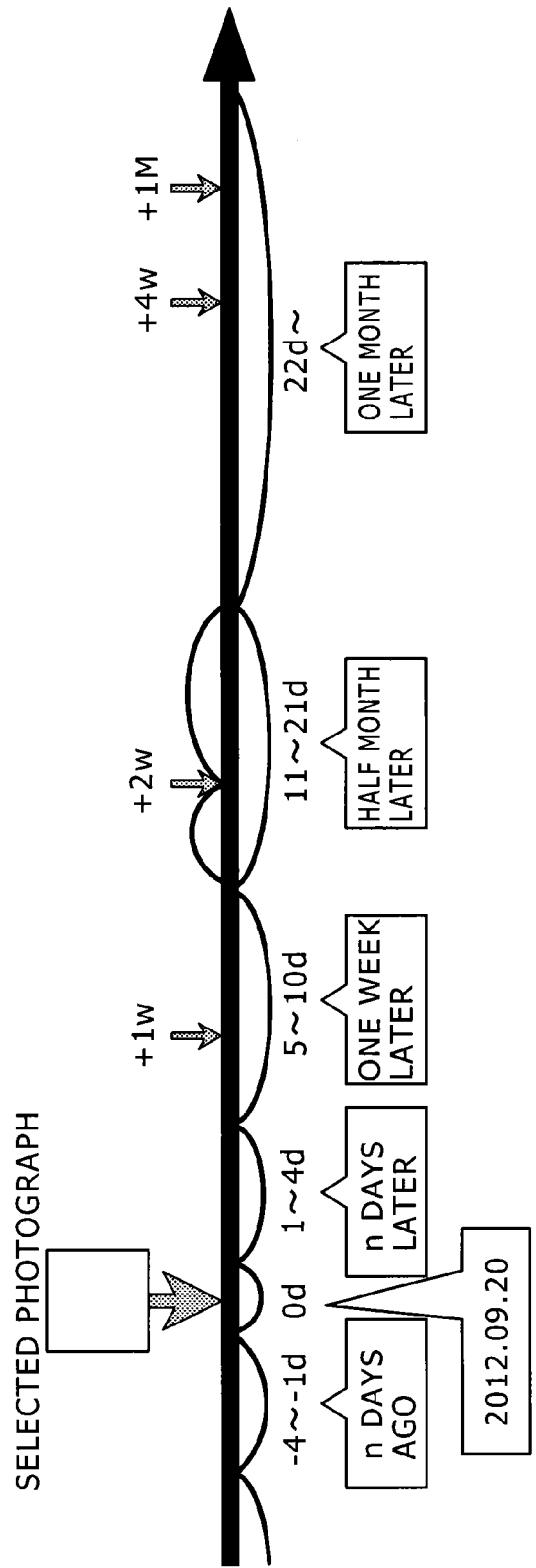
FIG. 26 is a diagram showing yet another example of divisions of a search range in the information processing system according to the fourth aspect of the embodiment of the present disclosure.

Relations between labels 81 displayed on the search narrowing-down display screen 30i of FIG. 21 and a search key as the basis on which a part of the thumbnail images 80 are searched for will be described in the following with reference to FIG. 26. FIG. 26 is a diagram of assistance in explaining relations between a search key (above-described search key (1) in the example shown in FIG. 26) and the display of labels 81. In FIG. 26, small ranges are set with respect to the photographing date and time tag information of the image file 10 corresponding to the thumbnail image 39 selected on the search display screen 30d1 of FIG. 20 as follows: a range of the same day as that of the photographing date and time tag information; ranges preceding and following the photographing date and time tag information by one day to four days; ranges preceding and following the photographing date and time tag information by five days to ten days; ranges preceding and following the photographing date and time tag information by 11 day to 21 days; and ranges preceding and following the photographing date and time tag information by 22 days and more.

At this time, for the small range of the same day, the year, month, and day itself is displayed as contents described in a label 81. The representation of the year, month, and day itself rather than the representation of "same day" has an advantage of making it easier for the user to estimate the actual months and days of other label representations such as "one week later" and "half month later" to be described later and the like. Next, for the small ranges preceding and following the above photographing date and time tag information by one day to four days, representations "n days later" and "n days ago" (n is a natural number of 1 to 4, and is selected according to the photographing date and time tag information of the retrieved image files 10) are displayed as contents described in labels 81. Further, for the small ranges preceding and following the above photographing date and time tag information by five days to ten days, representations "one week later" and "one week ago" are displayed as contents described in labels 81. Further, for the small ranges preceding and following the above photographing date and time tag information by 11 days to 21 days, representations "half month later" and "half month ago" are displayed as contents described in labels 81. For the small ranges preceding and following the above photographing date and time tag information by 22 days and more, representations "one month later" and "one month ago" are displayed as contents described in labels 81.

Thus describing the representations as shown in FIG. 26, for example, in the labels 81 rather than describing representations corresponding to the search keys in the labels 81 allows the user to understand intuitively and easily approximate days and times corresponding to the photographing date and time tag information of thumbnail images 80 corresponding to the labels 81. In addition, limiting the number of labels 81 displayed for one small range to one provides another advantage of being able to reduce the number of labels 81 to be displayed.

In this case, the small ranges shown in FIG. 26 are set so as to become larger (that is, the representations in the labels 81 become fuzzier) with increasing distance on a time axis from the photographing date and time tag information of the image file 10 corresponding to the selected thumbnail image 39. In addition, the small range preceding or following the above photographing date and time tag information by five days to ten days, by 11 days to 21 days, or by 22 days and more is set so as to include a reference point preceding or following the above photographing date and time tag information by one week, by two weeks, or by four weeks or one month, respectively. A time width from the reference point to a boundary point of the small range is set so as to increase with increasing distance on the time axis from the photographing date and time tag information of the image file 10 corresponding to the selected thumbnail image 39. Specifically, as for the small range preceding or following the above photographing date and time tag information by 11 days to 21 days, with respect to the reference point preceding or following the above photographing date and time tag information by two weeks, a time width preceding or following the above photographing date and time tag information by 11 days to 14 days is set on a side nearer to the photographing date and time tag information of the image file 10 corresponding to the thumbnail image 39 on the time axis, while a time width preceding or following the above photographing date and time tag information by 14 days to 21 days is set on a side more distant from the photographing date and time tag information of the image file 10 corresponding to the thumbnail image 39 on the time axis. The time width preceding or following the above photographing date and time tag information by 14 days to 21 days is about two times larger than the time width preceding or following the above photographing date and time tag information by 11 days to 14 days in terms of the numbers of days. Thus setting the small ranges to increase with increasing distance on the time axis from the photographing date and time tag information of the image file 10 corresponding to the selected thumbnail image 39 makes it possible to understand more intuitively and easily approximate days and times corresponding to the photographing date and time tag information of the thumbnail images 80 corresponding to the labels 81.

(Modifications)

It is to be noted that the information processing system according to the present disclosure is not limited to the foregoing embodiment, but is susceptible of various modifications.

As an example, files applied to the information processing system in the foregoing embodiment are image files 10, music files 60, and program files 70. However, files applicable to the information processing system according to the present disclosure are not limited to these, and are not limited as long as meta-information can be obtained from the files. As an example, the information processing system according to the present disclosure is applicable also to electronic mail files including text information of electronic mail, sender and receiver information, and the like. In this case, for example, a search key "senders belonging to a same organization" can be generated as a search key obtained by abstracting sender and receiver information, by using domain information in the electronic mail addresses of senders and receivers, and a search key "other persons that have sent and received n or more pieces of electronic mail (n is a natural number)" can be generated by subjecting sender and receiver information to statistical processing. In addition, a search key "electronic mail sent to and received by a family" can be generated as a search key obtained by using a thesaurus dictionary file or the like, from the sender and receiver information of electronic mail sent to a member of the family.

In addition, meta-information is described in advance in each region of the header sections 10a, 60a, and 70a of image files 10, music files 60, and program files 70 applied to the information processing system in the foregoing embodiment. However, meta-information may be obtained by referring to a thesaurus dictionary file or an external server on the WAN at a time of capturing these files into the information processing device 1 or at a time of selection of the files, and the obtained meta-information may be written in each region. Specifically, it suffices to store an ID (identification) number that can identify each of the image files 10 and the like in the header sections 10a of the image files 10 and the like, and obtain meta-information by referring to a thesaurus dictionary file or an external server on the WAN using the ID number as a key.

Further, in the foregoing first aspect of the embodiment of the present disclosure, the user specifies a plurality of search keys individually in order to obtain a search result as an union of sets or a product set on the basis of the plurality of search keys. However, a combination of search keys that would provide a useful search result may be set in advance, and the information processing device 1 may recommend the combination of the search keys.

Further, in the foregoing first aspect of the embodiment of the present disclosure, search keys generated by the search key generating block 27 are displayed on the output section 21, and the data searching block 28 searches for image files 10 within the storage section 23 on the basis of a search key selected by the input section 22. However, the display of the search keys is not essential. For example, only the thumbnail images 37 may be displayed on the search key display screen 30c of FIG. 6. In addition, without a thumbnail image 37 being selected by the input section 22 on the search key display screen 30c of FIG. 6, the data searching block 28 may search for image files 10 within the storage section 23 using at least one of search keys generated by the search key generating block 27, to display the search display screen 30d.

Figure 27:
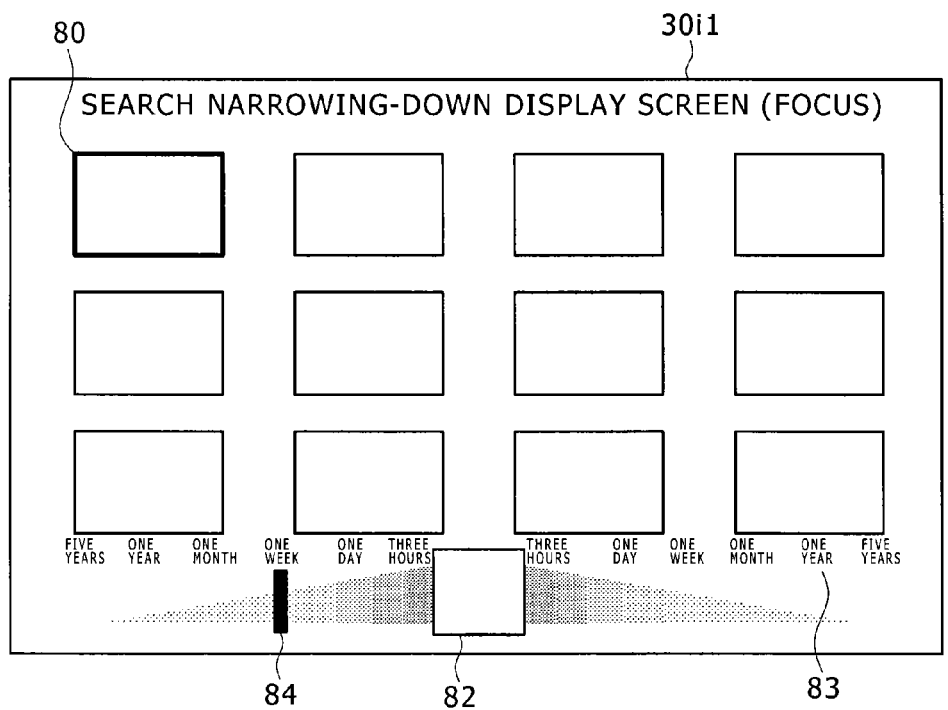
FIG. 27 is a diagram showing another example of the search narrowing-down display screen displayed in the information processing system according to the fourth aspect of the embodiment of the present disclosure.

Further, forms of display of the display screens in the foregoing embodiment are a mere example, and are of course susceptible of various modifications. For example, on the search narrowing-down display screen in the fourth aspect, index display indicating what amount of image files 10 that have been searched for on the basis of search keys may be made in addition to the search narrowing-down display screen 30i shown in FIG. 21. Specifically, an example is cited in which as shown in FIG. 27, a search narrowing-down display screen 30i1 displays, in a lower part thereof, a thumbnail image 82 of an image file 10 used to generate the search narrowing-down display screen 30i1, a time axis display portion 83 discretely displaying times on the time axis which times precede and follow the photographing date and time tag information of the image file 10 corresponding to the thumbnail image 82, and a time display bar 84 indicating an approximate position on the time axis of a thumbnail image 80 selected by the user.

Alternatively, when the photographing date and time tag information of the image file 10 corresponding to a thumbnail image selected by the user is displayed on the display screen in the foregoing embodiment, seven-segment display showing a date in for example a lower right portion of the thumbnail image is made to enable the user to view the photographing date and time tag information intuitively, though the seven-segment display is a simple display.

In addition, in the foregoing embodiment, a video signal, an audio signal, and the like output from the information processing device 1 are for example displayed by the HDMI output device 15 via the HDMI interface 6. However, the output interface is not limited to an HDMI interface, but a known output interface can be adopted. Further, the information processing device 1 may include an output section such as a liquid crystal display, a speaker, and the like.

In the foregoing embodiment, the program for operating the information processing device 1 is provided in a state of being stored in the ROM or the like. However, a DVD (Digital Versatile Disc), a USB flash memory device, or the like where the program is stored may be connected by using an optical disk drive, a USB port, or the like not shown in the figures, and the program may be read from the DVD or the like into the information processing device 1 to operate the information processing device 1. In addition, the program may be stored within a server device or the like located on the WAN, and the program may be read into the information processing device 1 via the network interface to operate the information processing device 1. Further, in the foregoing embodiment, the information processing device 1 is formed by a plurality of hardware elements. However, the CPU or the like can realize the operation of a part of these hardware elements by the operation of a program.

As described above, the present embodiment is applied to an information processing system including: an information processing device including a storage section storing data; an output section for displaying information output from the information processing device; and an input section for receiving an input instruction, and sending out an input instruction signal corresponding to the input instruction to the information processing device. Then, the above-described problems are solved by providing the information processing device with a file selecting section for making the output section display at least one of the data stored in the storage section or indexes indicating the data, and when receiving a data selection signal from the input section, the data selection signal accompanying selection of the at least one of the data or the indexes indicating the data, the at least one of the data or the indexes indicating the data being displayed by the output section, identifying the selected at least one of the data or the indexes indicating the data, an information obtaining block for obtaining information related to the at least one of the data or the indexes indicating the data, the at least one of the data or the indexes indicating the data being identified by the file selecting section, a search key generating block for, using at least one piece of the information obtained by the information obtaining block, generating at least one search key abstracted from the obtained information, and a data searching block for searching for data within the storage section on the basis of the at least one search key generated by the search key generating block, and making the output section display at least one of the data as a search result or indexes indicating the data.

The search key generating block generates at least one search key abstracted from the information related to the data, which information is obtained by the information obtaining block. The data searching block searches for data within the storage section on the basis of the at least one search key generated by the search key generating block, and makes the output section display at least one of the data as a search result or indexes indicating the data. It is thereby possible to search for the data without the user specifying the information related to the data in advance.

In addition, the present embodiment relates to an information processing device including a storage section storing data. In the present embodiment, the above-described problems are solved by providing: a file selecting section for presenting at least one of the data stored in the storage section or indexes indicating the data, and receiving a selection of the presented at least one of the data or the indexes indicating the data; an information obtaining block for obtaining information related to the at least one of the data or the indexes indicating the data, the selection of the at least one of the data or the indexes indicating the data being received by the file selecting section; a search key generating block for, using at least one piece of the information obtained by the information obtaining block, generating at least one search key abstracted from the obtained information; and a data searching block for searching for data within the storage section on the basis of the at least one search key generated by the search key generating block, and presenting at least one of the data as a search result or indexes indicating the data.

In this case, preferably, the search key generating block presents the at least one generated search key, and the data searching block receives a selection of the at least one search key presented by the search key generating block, and searches for data within the storage section on the basis of the at least one search key, the selection of the at least one search key being received.

In addition, preferably, the search key generating block generates a search key using a part of the information obtained by the information obtaining block. In addition, preferably, when the information obtained by the information obtaining block includes numerical value information, the search key generating block generates a search key indicating a range of the obtained information as the numerical value information. Further, preferably, using the search key indicating the range of the obtained information as the numerical value information, the search key being generated by the search key generating block, the data searching block divides the range of the obtained information into a plurality of small ranges, determines the number of data to be extracted as a search result from data falling within the small ranges, and makes a search. Further, preferably, the data searching block performs at least one of dividing the small ranges such that the small ranges are made smaller with decreasing distance from the numerical value information obtained by the information obtaining block and increasing the number of data to be extracted with decreasing distance from the numerical value information obtained by the information obtaining block, and makes a search.

Further, preferably, the search key generating block generates a search key indicating the number of data corresponding to information with which at least part of the information obtained by the information obtaining block coincides. In addition, preferably, the information obtaining block obtains a tag given to the data in advance as information.

Further, preferably, when the data is image data or moving image data, the information obtaining block obtains face recognition information for distinguishing a photographic subject by performing face recognition of the photographic subject included within the image data or the moving image data, and the search key generating block generates a search key for identifying the photographic subject using the face recognition information. In addition, preferably, the search key generating block generates the face recognition information as a search key.

Further, preferably, the data searching block receives a selection of a plurality of search keys presented by the search key generating block, and presents at least one of data as an union of sets of search results based on the plurality of search keys, the selection of the plurality of search keys being received, or a product set of the search results, or a combination of sums of sets or product sets of the search results. Further, preferably, the search key generating block generates a search key by applying a similar concept dictionary or a knowledge base set in advance to the information obtained by the information obtaining block. Further, preferably, the search key generating block preferentially generates a search key that has been received by the data searching block.

In addition, preferably, when the data is image data or moving image data, the information obtaining block obtains positional information of a place at which the image data or the moving image data was taken as information, and the search key generating block generates a search key using information on a landmark identified by the positional information obtained by the information obtaining block. Further, preferably, the search key generating block generates a plurality of search keys using at least one piece of the information obtained by the information obtaining block, and presents the plurality of search keys.

Preferably, after obtaining information related to at least part of data included in the data stored in the storage section, the file selecting section presents at least part of the data to which the obtained information is related or indexes indicating the data, and at this time, information related to the presented at least part of the data or the indexes is pieces of information different from each other.

In addition, an example of the present embodiment is an information processing method in an information processing device including a storage section storing data. In the present embodiment, the above-described problems are solved by: presenting at least one of the data stored in the storage section or indexes indicating the data, and receiving a selection of the presented at least one of the data or the indexes indicating the data; obtaining information related to the at least one of the data or the indexes indicating the data, the selection of the at least one of the data or the indexes indicating the data being received; generating, using at least one piece of the obtained information, at least one search key abstracted from the obtained information; and searching for data within the storage section on the basis of the at least one search key generated, and presenting at least one of the data as a search result or indexes indicating the data.

Further, an example of the present embodiment is an information processing program executed in a computer including a storage section storing data and a computer readable recording medium storing the information processing program. In the present embodiment, when the program is executed by the computer, the above-described problems are solved by: presenting at least one of the data stored in the storage section or indexes indicating the data, and receiving a selection of the presented at least one of the data or the indexes indicating the data; obtaining information related to the at least one of the data or the indexes indicating the data, the selection of the at least one of the data or the indexes indicating the data being received; generating, using at least one piece of the obtained information, at least one search key abstracted from the obtained information; and searching for data within the storage section on the basis of the at least one search key generated, and presenting at least one of the data as a search result or indexes indicating the data.

In the present embodiment, at least one search key abstracted from the obtained information is generated, and data within the storage section is searched for on the basis of the generated search key, and displayed. Thus, other data related to data can be searched for easily without the user specifying, in advance, a search key desired for the search and display.

What is claimed is:
1. An information processing system comprising:
an information processing device; and
a user interface configured to display information output from the information processing device, receive an input instruction, and send an input instruction signal corresponding to the input instruction to the information processing device;
wherein the information processing device includes:
a memory configured to store data; and
circuitry configured to:
control the user interface to display at least one of the data stored in the memory or indexes corresponding to the data;

receive a data selection signal from the user interface, the data selection signal accompanying selection of the at least one of the data or the indexes indicating the data displayed by the user interface;

obtain information related to the at least one of the selected data or the indexes indicating the data;

generate at least one search key abstracted from the obtained information;

search for data within the memory based on the at least one search key; and control the user interface to display at least one of the data or indexes corresponding to the data as a search result, wherein the obtained information related to the at least one of the selected data or the indexes indicating the data includes numerical value information, wherein the circuitry is configured to generate the at least one search key corresponding to a range including a numerical value of the numerical value information, wherein the circuitry is configured to divide the range into a plurality of ranges, wherein the circuitry is configured to modify the plurality of ranges such that each one range of the plurality of ranges is made smaller with decreasing distance from the numerical value, and wherein the circuitry is configured to search for data with the memory based on the modified plurality of ranges.

2. An information processing device comprising:

a memory configured to store data; and circuitry configured to:

control presenting at least one of the data stored in the memory or indexes corresponding to the data, and receiving a selection of the presented at least one of the data or the indexes corresponding to the data;

obtain information related to the at least one of the selected data or the indexes corresponding to the data;

generate at least one search key abstracted from the obtained information;

search for data within the memory based on the at least one search key; and controlling presenting at least one of the data and indexes corresponding to the data as a search result, wherein the obtained information related to the at least one of the selected data or the indexes corresponding to the data includes numerical value information, the circuitry is configured to generate the at least one search key corresponding to a range including a numerical value of the numerical value information, the circuitry is configured to divide the range into a plurality of ranges, the circuitry is configured to modify the plurality of ranges such that each one range of the plurality of ranges is made smaller with decreasing distance from the numerical value, and the circuitry is configured to search for data with the memory based on the modified plurality of ranges.

3. The information processing device according to claim 2, wherein the circuitry is configured to:

control presenting the at least one search key, receive a selection of the at least one search key; and search for data within the memory based on the selected at least one search key.

4. The information processing device according to claim 2, wherein the circuitry is configured to generate the at least one search key based on a part of the obtained information related to the at least one of the selected data or the indexes corresponding to the data.

5. The information processing device according to claim 1, wherein the circuitry is configured to generate the at least one search key corresponding to the modified plurality of ranges.

6. The information processing device according to claim 2, wherein the circuitry is configured to determine a number of data to be extracted as a search result from data falling within the plurality of ranges.

7. The information processing device according to claim 5, wherein the circuitry is configured to modify the plurality of ranges such that each one range of the plurality of ranges is made smaller with decreasing distance from the numerical value and a number of data to be extracted from the each one range of the plurality of ranges is increased with decreasing distance from the numerical value.

8. The information processing device according to claim 1, wherein the circuitry is configured to generate the at least one search key corresponding to a number of data coinciding with at least part of the obtained information related to the selected at least one of the data or the indexes corresponding to the data.

9. The information processing device according to claim 1, wherein the circuitry is configured to obtain a tag given to the data.

10. The information processing device according to claim 1, wherein the data is image data or moving image data, and the circuitry is configured to:

obtain face recognition information for distinguishing a photographic subject by performing face recognition of the photographic subject included within the image data or the moving image data; and generate the at least one search key for identifying the photographic subject using the face recognition information.

11. The information processing device according to claim 10, wherein the circuitry is configured to generate the face recognition information as the at least one search key.

12. The information processing device according to claim 2, wherein the circuitry is configured to:

receive a selection of a plurality of generated search keys; and present at least one of (1) data as an union of sets of search results based on the selected plurality of generated search keys, (2) a product set of the search results, and (3) a combination of the unions of sets or the product set of the search results.

13. The information processing device according to claim 1, wherein the circuitry is configured to generate the at least one search key by applying a similar concept dictionary or a knowledge base set in advance to the obtained information related to the at least one of the selected data or the indexes corresponding to the data.

14. The information processing device according to claim 1, wherein the circuitry is configured to preferentially generates the at least one search key that has been received as a result of the search.

15. The information processing device according to claim 1, wherein the data is image data or moving image data, and the circuitry is configured to:

obtain positional information of a place at which the image data or the moving image data was taken as information; and generate the at least one search key based on information corresponding to a landmark identified by the positional information.

16. The information processing device according to claim 1, wherein the circuitry is configured to:
generate a plurality of search keys using at least one piece of the obtained information related to the at least one of the selected data or the indexes corresponding to the data; and
control presenting the plurality of search keys.

17. The information processing device according to claim 1, wherein the circuitry is configured to:
obtain information related to at least part of data included in the data stored in the memory; and
present at least part of the data to which the obtained information is related or indexes corresponding to the data, wherein information related to the presented at least part of the data or the indexes is pieces of information different from each other.

18. An information processing method using an information processing device including a memory configured to store data, the information processing method comprising:
presenting at least one of the data stored in the memory or indexes corresponding to the data;
receiving a selection of the presented at least one of the data or the indexes corresponding to the data;
obtaining information related to the at least one of the selected data or the indexes corresponding to the data, the obtained information including numerical value information;
generating, using circuitry, at least one search key abstracted from the obtained information;
searching for data within the memory based on the at least one search key;
presenting at least one of the data and indexes corresponding to the data as a search result;
generating, using the circuitry, the at least one search key corresponding to a range including a numerical value of the numerical value information;
dividing, using the circuitry, the range into a plurality of ranges;
modifying, using the circuitry, the plurality of ranges such that each one range of the plurality of ranges is made smaller with decreasing distance from the numerical value; and
searching, using the circuitry, for data with the memory based on the modified plurality of ranges.

19. A non-transitory computer readable recording medium storing executable instructions, which when executed by an information processing device cause the information processing device to:
present at least one of data stored in memory or indexes corresponding to the data;
receive a selection of the presented at least one of the data or the indexes corresponding to the data;
obtain information related to the at least one of the selected data or the indexes corresponding to the data, the obtained information including numerical value information;
generate at least one search key abstracted from the obtained information;
search for data within the memory based on the at least one search key;
present at least one of the data or indexes corresponding to the data as a search result;
generate the at least one search key corresponding to a range including a numerical value of the numerical value information;
divide the range into a plurality of ranges;
modify the plurality of ranges such that each one range of the plurality of ranges is made smaller with decreasing distance from the numerical value; and
search for data with the memory based on the modified plurality of ranges.

20. The information processing system according to claim 1, wherein the circuitry is configured to modify the plurality of ranges such that each one range of the plurality of ranges is made smaller with decreasing distance from the numerical value, and a number of data to be extracted from the each one range of the plurality of ranges is increased with decreasing distance from the numerical value.

* * * * *